United States Patent
Wang et al.

(10) Patent No.: US 9,571,847 B2
(45) Date of Patent: Feb. 14, 2017

(54) GRADUAL DECODING REFRESH WITH TEMPORAL SCALABILITY SUPPORT IN VIDEO CODING

(71) Applicant: QUALCOMM Incorporated, San Diego, CA (US)

(72) Inventors: Ye-Kui Wang, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 14/147,973

(22) Filed: Jan. 6, 2014

(65) Prior Publication Data

US 2014/0192896 A1    Jul. 10, 2014

Related U.S. Application Data

(60) Provisional application No. 61/749,880, filed on Jan. 7, 2013.

(51) Int. Cl.

| | |
|---|---|
| H04N 7/18 | (2006.01) |
| H04N 11/02 | (2006.01) |
| H04N 11/04 | (2006.01) |
| H04N 19/44 | (2014.01) |
| H04N 19/70 | (2014.01) |
| H04N 19/107 | (2014.01) |

(Continued)

(52) U.S. Cl.
CPC ............ *H04N 19/44* (2014.11); *H04N 19/107* (2014.11); *H04N 19/31* (2014.11); *H04N 19/70* (2014.11); *H04N 19/46* (2014.11)

(58) Field of Classification Search
CPC ..... H05N 7/50; H04N 7/26335; H04N 7/36707
USPC ..................................... 375/240.25
See application file for complete search history.

(56) References Cited

U.S. PATENT DOCUMENTS

| | | |
|---|---|---|
| 8,606,025 B2 | 12/2013 | Lin |
| 2004/0260827 A1 | 12/2004 | Wang |
| 2005/0021814 A1 | 1/2005 | Wang |

(Continued)

OTHER PUBLICATIONS

3GPP Draft: "Overview of HEVC High-Level Syntax and Reference Picture Management," S4-121322, 3rd Generation Partnership Project (3GPP), Mobile Competence Centre; 650, Route Des Lucioles; F-06921 Sophi, Oct. 31, 2012, XP050687115, 14 pp.

(Continued)

*Primary Examiner* — Chikaodili E Anykire
(74) *Attorney, Agent, or Firm* — Shumaker & Sieffert, P.A.

(57) ABSTRACT

An example method of decoding video data includes receiving a plurality of pictures, receiving, in a message associated with a first picture of the plurality of pictures, information indicating a picture order count (POC) value of a recovery point picture of a gradual decoder refresh (GDR) set, when a picture that follows the first picture in decoding order has the POC value that is equal to a POC value of the recovery point picture, identifying the picture having the POC value equal to the POC value of the recovery point picture, as a recovery point picture, and when none of the pictures that follow the first picture has the POC value that is equal to the POC value of the recovery point picture, identifying one of the pictures that has a POC value greater than the POC value of the recovery point picture as the recovery point picture.

22 Claims, 7 Drawing Sheets

(51) Int. Cl.
H04N 19/31 (2014.01)
H04N 19/46 (2014.01)

(56) References Cited

U.S. PATENT DOCUMENTS

| | | | |
|---|---|---|---|
| 2010/0189182 A1* | 7/2010 | Hannuksela ... | H04N 21/234327 375/240.25 |
| 2012/0185570 A1 | 7/2012 | Bouazizi et al. | |
| 2013/0128991 A1 | 5/2013 | Nakagawa et al. | |
| 2013/0170561 A1 | 7/2013 | Hannuksela | |
| 2013/0235152 A1 | 9/2013 | Hannuksela et al. | |
| 2014/0153636 A1* | 6/2014 | Esenlik ............ | H04N 19/00066 375/240.02 |
| 2014/0192897 A1 | 7/2014 | Wang et al. | |

OTHER PUBLICATIONS

"HEVC Test Model (HM): Lib/TLibEncoder/SEIwrite.cpp Source File," Oct. 18, 2012, XP055114867, 6 pp.
Aoki et al., "AHG9: SEI messages for gradual decoding refresh," NEC Corporation, Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCTVC-J0064, 15 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Hannuksela et al., "Random Access Using Isolated Regions," Proceedings 2003 International Conference on Image Processing (CAT. No. 03CH37429), Barcelona, Spain, Sep. 14-17, 2003; [International Conference on Image Processing], IEEE, IEEE Piscataway, NJ, USA, vol. 3, XP010669965, pp. 841-844.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Joshi et al., "AHG9: On POC," 10. JCT-VC Meeting; MPEG Meeting; Jul. 11-20, 2012; Stockholm, SE; (Joint Collaborative Team on Video Coding of ITU-T SG.16 WP3 and ISO/IEC JTC1/SC29/WG11); URL: http://wftp3.itu.int/av-arch/jctvc-site/, document No. JCTVC-J0110, XP030112472, 5 pp.
Kazui et al., "Modification of recovery point SEI message," Fujitsu Laboratories Ltd., Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document: JCTVC-I0044, 2 pp.
Wang et al., "POC Recovery in Random Access Point SEI," JVT Meeting; MPEG Meeting; Dec. 5-13, 2002; Awaji, JP; (Joint Video Team of ISO/IEC JTC1/SC29/WG11 and ITU-T SG.16), No. JVT-F050, XP030005621, 6 pp.
Wang "AHG9: Signalling of regions of interest and gradual decoding refresh," JCT-VC Meeting; MPEG Meeting; Oct. 10-19, 2012; Shanghai, CN; (Joint Collaborative Team on Video Coding of ISO/IEC JTC1/SC29/WG11 and ITU-T SG.16 ); URL: http://wftp3.itu.int/av-arch/jctvc-site, No. JCTVC-K0128, XP030113010, 4 pp.
Wang, "AVS-M: From Standards to Applications," Journal of Computer Science and Technology, Kluwer Academic Publishers, BO, vol. 21, No. 3, May 2006, XP019411312, ISSN: 1860-4749, pp. 332-344.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
International Search Report and Written Opinion from International Application No. PCT/US2014/010482, dated May 2, 2014, 13 pp.
Second Written Opinion from International Application No. PCT/US2014/010482, dated Jan. 30, 2015, 8 pp.
International Preliminary Report on Patentability from International Application No. PCT/US2014/010482, dated Apr. 27, 2015, 8 pp.

* cited by examiner

GRADUAL DECODING REFRESH WITH TEMPORAL SCALABILITY SUPPORT IN VIDEO CODING

This application claims the benefit of U.S. Provisional Application No. 61/749,880, filed Jan. 7, 2013, the entire contents of which are incorporated herein by reference.

TECHNICAL FIELD

This disclosure relates to video coding and, more particularly, techniques for coding video in accordance with gradual decoding refresh (GDR).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve more compression.

SUMMARY

In general, this disclosure describes techniques for coding temporally scalable video bitstreams while supporting gradual decoding refresh (GDR) operations.

In one example, a method of decoding video data includes receiving a plurality of pictures from an encoded video bitstream, receiving, from the encoded video bitstream, in a message associated with a first picture of the plurality of pictures, information indicating a picture order count (POC) value of a recovery point picture of a gradual decoder refresh (GDR) set, when a picture that follows the first picture in decoding order has the POC value that is equal to a POC value of the recovery point picture, identifying the picture having the POC value equal to the POC value of the recovery point picture as a recovery point picture, and when none of the pictures that follow the first picture has the POC value that is equal to the POC value of the recovery point picture, identifying one of the pictures that has a POC value greater than the POC value of the recovery point picture as the recovery point picture.

In another example, a device for decoding video data includes a memory configured to store encoded video data and a video decoder. In this example, the video decoder is configured to receive a plurality of pictures of the encoded video data, receive, in a message associated with a first picture of the plurality of pictures, information indicating a POC value of a recovery point picture of a gradual decoder refresh (GDR) set, when a picture that follows the first picture in decoding order has the POC value that is equal to a POC value of the recovery point picture, identify the picture having the POC value equal to the POC value of the recovery point picture as a recovery point picture, and when none of the pictures that follow the first picture has the POC value that is equal to the POC value of the recovery point picture, identify one of the pictures that has a POC value greater than the POC value of the recovery point picture as the recovery point picture.

In another example, a computer-readable storage medium has stored thereon instructions that, when executed, cause a processor of a computing device to receive a plurality of pictures from an encoded video bitstream, receive, from the encoded video bitstream, in a message associated with a first picture of the plurality of pictures, information indicating a POC value of a recovery point picture of a gradual decoder refresh (GDR) set, when a picture that follows the first picture in decoding order has the POC value that is equal to a POC value of the recovery point picture, identify the picture having the POC value equal to the POC value of the recovery point picture as a recovery point picture, and when none of the pictures that follow the first picture has the POC value that is equal to the POC value of the recovery point picture, identify one of the pictures that has a POC value greater than the POC value of the recovery point picture as the recovery point picture.

In another example, a device for decoding video data includes means for receiving a plurality of pictures from an encoded video bitstream, means for receiving, from the encoded video bitstream, in a message associated with a first picture of the plurality of pictures, information indicating a POC value of a recovery point picture of a gradual decoder refresh (GDR) set, means for identifying, when a picture that follows the first picture in decoding order has the POC value that is equal to a POC value of the recovery point picture, the picture having the POC value equal to the POC value of the recovery point picture as a recovery point picture, and means for identifying, when none of the pictures that follow the first picture has the POC value that is equal to the POC value of the recovery point picture, one of the pictures that has a POC value greater than the POC value of the recovery point picture as the recovery point picture.

In another example, a method of decoding video data includes receiving, in a message associated with a picture, information indicating a refreshed region of the picture, determining whether the picture comprises a last picture in a gradual decoder refresh (GDR) set, determining whether the picture comprises a recovery point picture, responsive to determining that the picture comprises the last picture in the GDR set and the recovery point picture, determining that the message indicates that the entire picture belongs to the refreshed region of the picture, and decoding the picture based on the determination that the message indicates that the entire picture belongs the refreshed region of the picture.

In another example, a device for decoding video data includes a memory storing encoded video data and a video coder. In this example, the video coder is configured to receive, in a message associated with a picture of the encoded video data, information indicating a refreshed region of the picture, determine whether the picture comprises a last picture in a gradual decoder refresh (GDR) set, determine whether the picture comprises a recovery point picture, responsive to determining that the picture comprises the last picture in the GDR set and the recovery point picture, determine that the message indicates that the entire picture belongs to the refreshed region of the picture, and decode the picture based on the determination that the message indicates that the entire picture belongs the refreshed region of the picture.

In another example, a computer-readable storage medium has stored thereon instructions that, when executed, cause a processor of a computing device to receive from an encoded video bitstream a message associated with a picture, the message comprising information indicating a refreshed region of the picture, determine whether the picture comprises a last picture in a gradual decoder refresh (GDR) set, determine whether the picture comprises a recovery point picture, responsive to determining that the picture comprises the last picture in the GDR set and the recovery point picture, determine that the message indicates that the entire picture belongs to the refreshed region of the picture, and decode the picture based on the determination that the message indicates that the entire picture belongs the refreshed region of the picture.

In another example, a device for decoding video data includes means for receiving, in a message associated with a picture, information indicating a refreshed region of the picture, means for determining whether the picture comprises a last picture in a gradual decoder refresh (GDR) set, means for determining whether the picture comprises a recovery point picture, means for, responsive to determining that the picture comprises the last picture in the GDR set and the recovery point picture, determining that the message indicates that the entire picture belongs to the refreshed region of the picture, and means for decoding the picture based on the determination that the message indicates that the entire picture belongs the refreshed region of the picture.

The details of one or more examples are set forth in the accompanying drawings and the description below. Other features, objects, and advantages will be apparent from the description and drawings, and from the claims.

DETAILED DESCRIPTION

Figure 1:
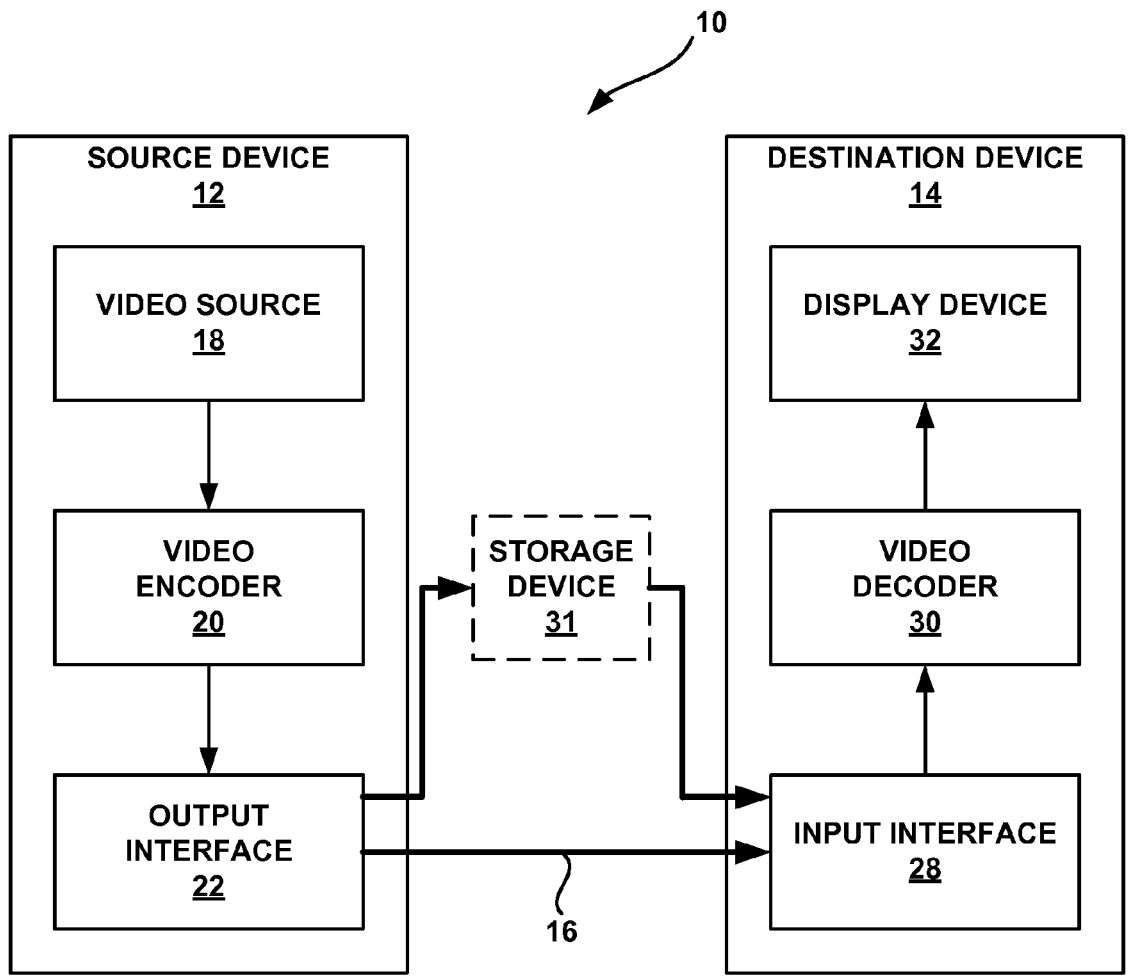
FIG. 1 is a block diagram illustrating an example video encoding and decoding system that may implement one or more techniques described in this disclosure.

In general, techniques of this disclosure are directed to coding video data using gradual decoding refresh (GDR), while supporting temporal scalability of the coded video data. According to various examples of this disclosure, a video coding device may use messages provided by the supplemental enhancement information (SEI) mechanism supported by both the AVC and HEVC standards, to support GDR operations, while also supporting temporal scalability. In this manner, the techniques of this disclosure may enable video coding devices to leverage existing hardware, software, and communication infrastructures, while enhancing GDR-based coding to support temporal scalability.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Jun. 6, 2013, is downloadable from: http://phenix.int-evry.fr/jct/doc_end_user/documents/12_Geneva/wg11/JCTVC-L1003-v34.zip. The entire content of WD10 is hereby incorporated by reference. The AVC (ITU-T) H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Another recent Working Draft (WD) of HEVC, and referred to as HEVC WD9 hereinafter, is available from http://phenix.int-evry.fr/jct/doc_end user/documents/11_Shanghai/wg11/JCT-VC-K1003-v8.zip. The entire contents of HEVC WD9 (BROSS et al., "High efficiency video coding (HEVC) text specification draft 9," Document JCTVC-K1003_v7, 11 th Meeting: Shanghai, C N, 10-19 Oct. 2012, 290 pp.) are incorporated herein by reference.

HEVC WD9 describes coding operations to support coding of video data using GDR. GDR may enable a device to code a set of pictures, such as a sequence or series of pictures arranged in decoding order. Such a sequence of pictures is referred to herein as a "GDR picture set" or a "GDR set." Upon traversing the entire GDR set (e.g., upon reaching the end of the GDR set), the video coding device may randomly access one or more encoded pictures that follow the set, in decoding order. In various examples, the video coding device may correctly or accurately decode the entirety of the last picture of the GDR set. In such examples, the first picture of the GDR set may represent a "GDR picture" and the last picture in the GDR set may represent a "recovery point picture." A recovery point picture may, in turn, represent a picture in which the entire picture is included in a "refreshed" or "foreground" region. Hence, the picture is gradually refreshed over a series of pictures in the GDR set until, at the recovery point picture, the picture is completely refreshed. The video coding device may determine the bounds of the GDR set, as well as other information pertaining to the GDR set, using particular SEI messages, such as a "recovery point" SEI message and/or a "region refresh information" SEI message.

Additionally, both the HEVC and AVC standards support temporal scalability of video bitstreams. Temporal scalability may enable a video coding device to determine that a subset of encoded video data may be extracted from a full bitstream of encoded video data. Such a subset of encoded video data (e.g., encoded pictures), extracted from a full bitstream in accordance with temporal scalability, may be referred to as a "temporal subset." In turn, temporal scalability as supported by the AVC and HEVC standards may enable a video coding device to determine multiple temporal subsets from a full bitstream, such that the various temporal subsets include varying numbers of encoded pictures. A lower, or "coarser" temporal subset may include a lesser number of encoded pictures from the full bitstream, and may represent a lower picture rate or frame rate. Conversely, a higher, or "finer" temporal subset may include a greater number of encoded pictures from the full bitstream, and may represent a higher picture rate or frame rate.

Video coding devices configured to apply existing implementations of GDR-based coding to temporally scalable bitstreams may encounter, or present, one or more potential inaccuracies with respect to the GDR set. For instance, according to existing implementations of GDR, a syntax element included in the recovery point SEI message may indicate a number of consecutive encoded pictures, following the GDR picture in decoding order, that form the GDR set. Consequently, in instances where a temporal subset is signaled by an encoder, the number of consecutive encoded pictures in the GDR set, as indicated by the syntax element of the recovery point SEI message, may be inaccurate. For example, because the temporal subset represents a smaller number of encoded pictures than the full bitstream or other higher temporal layer, one or more encoded pictures of the original GDR set may be absent from the temporal subset that is actually received by the decoder. The temporal subset may be extracted, for example, by an intermediate network element that receives a full temporal set. The intermediate network element then provides the extracted temporal subset to a client device including a decoder. As another example, a server may extract temporal subsets or store multiple temporal subsets for delivery to a client device including a decoder.

The syntax element indicating the number of pictures in the GDR set may not be dynamically updated to reflect the reduced number of encoded pictures in the corresponding GDR set of the extracted temporal subset. Accordingly, there may be a mismatch between the number of consecutive encoded pictures forming the GDR set for the higher temporal layer, and the number of consecutive encoded pictures in a corresponding GDR set of a lower temporal layer extracted therefrom. For instance, the recovery point picture indicated by the recovery point SEI message may have been discarded during extraction of the temporal subset that makes up the lower temporal layer. In this example, the indicated recovery point picture may "not exist" with respect to the lower temporal layer that makes up the signaled encoded video bitstream received by the decoder. As a result, due to the absence of one or more pictures in a GDR set in the case of temporal sub-bitstream extraction, the GDR operations may not work properly on the decoder side.

To alleviate or potentially eliminate such inaccuracies of GDR-based coding with respect to temporally scalable bitstreams, the techniques of this disclosure may enable a video coding device to identify a recovery point picture, regardless of whether the recovery point picture indicated in the recovery point SEI message exists in the encoded video bitstream actually received by the decoder. For instance, the video decoding device may determine whether an encoded video bitstream includes an encoded picture having the POC value of a recovery point picture, where the POC value is indicated in a recovery point SEI message included in the bitstream. If the video coding device detects an encoded picture in the bitstream with the POC value indicated in the recovery point SEI message, the video coding device may identify the detected picture as the recovery point picture. Additionally, in this example, the video coding device may determine that the identified recovery point picture also forms the last picture of the GDR set.

On the other hand, if a video coding device, implementing the techniques described herein, does not detect a picture in the received bitstream that has the POC value indicated in the recovery point SEI message (i.e., the POC value of the recovery point picture), the video coding device may identify, as the recovery point picture, a picture received by the decoder having a POC value greater than the POC value indicated in the recovery point SEI message. For instance, the video coding device may identify the recovery point picture as the first picture of the bitstream, in decoding order, that has a POC value greater than the POC value indicated in the recovery point SEI message. Additionally, in this scenario, the video coding device may identify a picture that is received in the bitstream and which immediately precedes the identified recovery point picture as the last picture in the GDR set. For instance, the picture of the bitstream that immediately precedes the identified recovery point picture may be the picture that has a POC value that is less than, and closest to, the POC value of the identified recovery point picture.

In other words, in this scenario, the video coding device may identify two different pictures as the last picture in the GDR set and the recovery point picture. For instance, in this scenario, the last picture in the GDR set and the recovery point picture may be two consecutive pictures, in decoding order, included in the encoded video bitstream. In this manner, one or more techniques of this disclosure may enable a video coding device to decode a received picture set according to GDR, while also supporting temporally scalable video bitstreams. For instance, by identifying the recovery point picture as a picture that follows the originally-identified picture in decoding order, the video coding device may select a picture that is fully refreshed, as the selected picture is positioned subsequently to a fully refreshed picture of the originally generated bitstream.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 31. Similarly, encoded data may be accessed from storage device 31 by input interface. Storage device 31 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 31 may correspond to a file server or another intermediate storage device that may hold the encoded video generated by source device 12. Destination device 14 may access stored video data from storage device 31 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 31 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 31 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored to a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU may include a luma coding block and two chroma coding blocks. The CU may have associated prediction units (PUs) and transform units (TUs). Each of the PUs may include one luma prediction block and two chroma prediction blocks, and each of the TUs may include one luma transform block and two chroma transform blocks. Each of the coding blocks may be partitioned into one or more prediction blocks that comprise blocks of samples to which the same prediction applies. Each of the coding blocks may also be partitioned in one or more transform blocks that comprise blocks of sample on which the same transform is applied.

A size of the CU generally corresponds to a size of the coding node and is typically square in shape. The size of the CU may range from 8×8 pixels up to the size of the treeblock with a maximum of 64×64 pixels or greater. Each CU may define one or more PUs and one or more TUs. Syntax data included in a CU may describe, for example, partitioning of the coding block into one or more prediction blocks. Partitioning modes may differ between whether the CU is skip or direct mode encoded, intra-prediction mode encoded, or inter-prediction mode encoded. Prediction blocks may be partitioned to be square or non-square in shape. Syntax data included in a CU may also describe, for example, partitioning of the coding block into one or more transform blocks according to a quadtree. Transform blocks may be partitioned to be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may represent the TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

One or both of video encoder 20 and video decoder 30 may implement techniques of this disclosure to code video data in accordance with gradual decoding refresh (GDR), while supporting temporally scalable bitstreams. Video encoder 20 may be configured or otherwise operable to encode a series or sequence of pictures to form a GDR set. For instance, video encoder 20 and/or video decoder 30 may determine that each picture of the GDR set is gradually refreshed via intra-coding of a respective portion of the picture. As different portions are successively intra-refreshed over the series of pictures that forms the GDR set, a last picture of the GDR set (and one or more subsequent pictures) may be entirely refreshed. In turn, video encoder 20 may signal the GDR set, as part of an encoded video bitstream, to video decoder 30.

One or both of video encoder 20 and video decoder 30 may identify the GDR set as a sequence of pictures beginning at a first GDR picture, and including one or more pictures that follow the first GDR picture in decoding order. Additionally, to identify the GDR set, video encoder 20 and/or video decoder 30 may identify the GDR picture as a picture associated with a recovery point SEI message. For instance, video encoder 20 may generate the recovery point SEI message to include a "recovery_poc_cnt" syntax element. Video encoder 20 may generate the recovery_poc_cnt syntax element to have a value that indicates a difference, or delta, between the POC value of the first GDR picture and the recovery point picture associated with the same GDR set. The recovery point picture typically will be the last picture in the original GDR set prepared by video encoder 20.

Video encoder 20 may also generate and signal a region refresh information SEI message that includes information on refreshed and non-refreshed regions of pictures in the GDR set, in accordance with GDR. For instance, video encoder 20 may signal a region refresh information SEI message with respect to each encoded picture of the GDR set. In turn, video decoder 30 may decode each region refresh information SEI message to determine a refreshed region of the corresponding picture. For instance, video encoder 20 may signal a respective region refresh information SEI message in the AU corresponding to each picture of the GDR set. In various examples, video decoder 30 may decode the region refresh information SEI message corresponding to the last picture in the GDR set to determine that the entire picture corresponds to a refreshed region. In other words, in such examples, video decoder 30 may determine that the last picture in the GDR set is "fully refreshed," based on decoding the region refresh information SEI message signaled in the same AU as the picture by video encoder 20. An overview of SEI messages, as supported in an HEVC working draft (e.g., "WD9") is illustrated in Table 1 below.

TABLE 1

Overview of SEI Messages

| SEI message | Purpose |
|---|---|
| Buffering period | Initial delays for hypothetical reference decoder (HRD) operation |
| Picture timing | Picture output time and picture/sub-picture removal time for HRD operation, as well as picture structure related information |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access. Gradual decoding refresh. |

TABLE 1-continued

Overview of SEI Messages

| SEI message | Purpose |
| --- | --- |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Structure of pictures description | Describes the temporal and inter prediction structure of the bitstream |
| Decoded picture hash | Checksum of the decoded picture, which may be used for error detection |
| Active parameter sets | Provides information on of active VPS, SPS, etc. |
| Decoding unit information | Sub-picture removal time for HRD operation, as well as decoding unit index |
| Temporal level zero index | Provides temporal level zero index values |
| Scalable nesting | Provides a mechanism to nest SEI messages for association to different operation points and layers |
| Region refresh information | Provides information on refreshed and non-refreshed region for gradual decoding refresh |

Syntax and semantics for the recovery point SEI message, as supported in HEVC WD9, are illustrated in syntax table 1 below.

SYNTAX TABLE 1

| recovery_point( payloadSize ) { | Descriptor |
| --- | --- |
| recovery_poc_cnt | se(v) |
| exact_match_flag | u(1) |
| broken_link_flag | u(1) |
| } | |

Syntax and semantics for the region refresh SEI message, as supported in HEVC WD9, are illustrated in syntax table 2 below.

SYNTAX TABLE 2

| region_refresh_info( payloadSize ) { | Descriptor |
| --- | --- |
| refreshed_region_flag | u(1) |
| } | |

Video decoder 30 may detect the start of a GDR set based on detecting the recovery point SEI message in the received encoded video bitstream. Additionally, video decoder 30 may identify the encoded picture associated with the recovery point SEI message as the first GDR picture. For instance, the recovery point SEI message may be associated with a particular picture by virtue of being included in the same access unit (AU) as the picture. In turn, video decoder 30 may apply the value of the recovery_poc_cnt syntax element to the POC value of the GDR picture, to determine the POC value of the recovery point picture. Upon detecting the recovery point picture by applying the derived POC value, video decoder 30 may determine that the recovery point picture is a fully refreshed picture, and that the recovery point picture, as well as one or more pictures that follow the recovery point picture in decoding order, can be decoded (e.g., intra-decoded) correctly or approximately correctly.

Additionally, video decoder 30 may decode one or more region refresh information SEI messages signaled in the bitstream, to obtain information on refreshed and non-refreshed regions of pictures in the GDR set. For instance, video decoder 30 may decode a separate region refresh information SEI message with respect to each picture in the GDR set. As an example, video decoder 30 may decode a respective region refresh information SEI message included in each AU that includes a corresponding picture of the GDR set. In turn, video decoder 30 may determine a refreshed region (and/or conversely, a non-refreshed region) of a particular picture, based on data obtained from decoding a region refresh information SEI message corresponding to the particular picture. Upon decoding a region refresh information SEI message that indicates that the entirety of the associated picture corresponds to a refreshed region, video decoder 30 may determine that the associated picture is fully refreshed. For instance, video decoder 30 may determine that the fully refreshed picture forms a last picture in the GDR set. Based on determining that a picture is the last picture in the GDR set, and thereby determining that the picture is fully refreshed, video decoder 30 may determine that the last picture in the GDR set, as well as one or more pictures that follow the last picture in the GDR set in decoding order, can be decoded (e.g., intra-decoded) correctly or approximately correctly. Typically, video decoder 30 determines that a recovery point picture identified by the recovery point SEI message is the same as a last picture in the same GDR set, as identified by a corresponding region refresh information SEI message that indicates a fully-refreshed state.

Additionally, in accordance with HEVC WD9, one or both of video encoder 20 and video decoder 30 may support temporal scalability of encoded video bitstreams. For instance, video encoder 20 and video decoder 30 may support varying picture rates (or "frame rates") provided by different encoded video bitstreams. For instance, video encoder 20 may signal a full encoded video bitstream that represents a higher temporal layer. To support a lower temporal picture rate than a full encoded video bitstream, video decoder 30, or an intermediate device positioned between video encoder 20 and video decoder 30, such as an intermediate network element or server, may extract a temporal subset of the full encoded video bitstream. In a specific example, the intermediate device may extract a subset of the encoded pictures included in the full encoded video bitstream, and relay the extracted subset to video decoder 30. In other words, the subset of encoded pictures actually received at video decoder 30 may include the full encoded video bitstream that was originally generated by video encoder 20, or in the case of temporal scaling, at least one less encoded picture, in comparison to the full encoded video bitstream that was originally generated by video encoder 20. A subset of encoded pictures received by video decoder 30 to support a lower picture rate is referred to herein as a "temporal subset" or a "sub-bitstream."

Video decoder 30 may receive different temporal subsets, in accordance with different picture rates provided via temporal scalability of encoded video bitstreams. In one example, video decoder 30 may support a low picture rate, by receiving and decoding a first temporal subset of the full encoded video bitstream originally signaled by video encoder 20. According to this example, video decoder 30 may support an intermediate picture rate, by receiving and decoding a second temporal subset, which includes at least one more encoded picture than the first temporal subset, but at least one less encoded picture than the full encoded video bitstream. In this example, video decoder 30 may support a highest possible picture rate by receiving and decoding the entirety (e.g., the full set of encoded pictures) of the full encoded video bitstream originally signaled by video encoder 20.

However, in some instances where video decoder 30 receives a GDR set as part of a temporal subset in accordance with HEVC WD9, the recovery point picture may have been discarded during extraction of the temporal subset, and not transmitted to the decoder, such that the actual recovery point picture from the originally encoded bitstream may not exist in the encoded video bitstream received by video decoder 30. As a result, in these examples, video decoder 30 may be unable to locate the recovery point picture by applying the value of the recovery_poc_cnt syntax element included in the recovery point SEI message. In other words, video decoder 30 may not be able to identify a picture at the end of the GDR set that is entirely refreshed according to GDR. As a result, the GDR operation at decoder 30 may not work properly.

To mitigate or eliminate the potential inaccuracies described above with respect to temporally scaled GDR sets, video decoder 30 may implement one or more techniques of this disclosure. In some implementations of the techniques described herein, video decoder 30 may determine whether or not the recovery point picture, as identified by the recovery_poc_cnt syntax element in the recovery point SEI message, is included in the received encoded video bitstream. If video decoder 30 determines, based on calculating a POC value from the value of the recovery_poc_cnt syntax element, that the recovery point picture is included in the encoded video bitstream, video decoder 30 may identify such a picture as the recovery point picture. Thereafter, decoder 30 may use the recovery point picture and subsequent pictures as fully refreshed pictures. For example, video decoder 30 may decode the recovery point picture and one or more subsequent pictures in decoding order by performing random access. Additionally, in this instance, video decoder 30 may also identify the recovery point picture as the last picture in the GDR set. The last picture in the GDR set, as identified by video decoder 30, may be referred to herein as a variable denoted by "lastPicInSet." In examples where the lastPicInSet is the recovery point picture identified in the recovery point SEI message, video decoder 30 may determine that the lastPicInSet is entirely refreshed in accordance with GDR.

On the other hand, if video decoder 30 is unable to locate a picture that with the POC value derived from the value of the recovery_poc_cnt syntax element, video decoder 30 may implement one or more techniques of this disclosure to identify an alternate recovery point picture. In some examples, video decoder 30 may identify the recovery point picture as the first picture, in decoding order, that has a POC value greater than the POC value derived from the recovery_poc_cnt syntax element. For instance, video decoder may derive the POC value of the identified recovery point picture by adding the value of the recovery_poc_cnt syntax element to the POC value of the first GDR picture. Additionally, in these examples, video decoder 30 may determine that the lastPicInSet is the picture that immediately precedes the identified recovery point picture. For instance, the lastPicInSet may be the last picture, in decoding order, that has a POC value less than the POC value derived from the recovery_poc_cnt syntax element, while the recovery point may be the first picture, in decoding order, that has a POC value greater than the POC value derived from the recovery_poc_cnt syntax element. Thus, in examples where the recovery point picture identified by the recovery point SEI message has been discarded during temporal scaling, video decoder 30 may implement techniques of this disclosure to identify two separate pictures, which are consecutive in decoding order, as the lastPicInSet and the recovery point picture, respectively.

In turn, in this example, video decoder 30 may perform random access decoding with respect to one or more pictures that follow the GDR set in decoding order. Hence, in one case, if a picture having the POC value of the recovery point picture is present in the bitstream received by decoder 30, the decoder selects that picture as both the recovery point picture and the last picture of the pertinent GDR set. In the other case, if a picture having the POC value of the recovery point picture is not present in the bitstream received by decoder 30, the decoder selects one picture as the recovery point picture and a different picture as the last picture of the pertinent GDR set, as described above. In this second case, the selected recovery point picture is the first picture in the received bitstream, in decoding order, having a POC value greater than the POC value derived from the recovery_poc_cnt syntax element, and the selected last picture in the GDR set is the last picture in the received bitstream, in decoding order, that has a POC value less than the POC value derived from the recovery_poc_cnt syntax element, i.e., the picture that immediately precedes the selected recovery point picture. Additionally, in this second case, video decoder 30 may select, as the last picture in the GDR set, a picture that a corresponding region refresh information SEI message indicates is not fully refreshed (e.g., a picture that includes both refreshed and non-refreshed regions).

In some examples, video decoder 30 may implement the techniques of this disclosure with respect to one or more region refresh SEI messages associated with the lastPicInSet of the GDR set. For instance, if video decoder 30 determines that the lastPicInSet is also the recovery point picture, then video decoder 30 may determine that the region refresh SEI message corresponding to the picture indicates that the entire picture belongs to the refreshed region of the picture. As described above, in various examples, video decoder 30 may determine that the lastPicInSet is also the recovery point picture if video decoder 30 detects a picture in the GDR set that has the POC value for the recovery point picture, as indicated by the recovery point SEI message.

In one such example, video decoder 30 may determine that the region refresh SEI message includes a refreshed_region_flag syntax element that is set to a value of 1, and is associated with the first slice segment of the AU that includes the picture. According to this example, based on the refreshed_region_flag syntax element for the first slice segment of the AU being set to 1, video decoder 30 may determine that the refreshed_region_flag syntax elements for the remaining slice segments of the AU are also set to a value of 1. In this manner, video decoder 30 may determine that when the lastPicInSet is also the recovery point picture, the lastPicInSet is a fully refreshed picture.

A potential advantage of the techniques described herein is that video decoder 30 may support GDR for temporally scaled bitstreams, while not requiring changes to existing hardware infrastructure. Additionally, in some examples, the techniques described herein do not require video encoder 20 to implement any changes with respect to generating either the recovery point SEI message or the region refresh SEI message. Instead, video decoder 30 may implement the techniques to process the information included in the recovery point SEI message and/or the region refresh SEI message to support GDR with respect to temporally scalable bitstreams. In other words, in some examples, techniques of this disclosure may introduce changes to semantics of the recovery point SEI message and/or the region refresh SEI message, without introducing any changes to the syntax of either of these SEI messages.

In this manner, destination device 14 may be an example of a device for decoding video data, comprising a memory configured to store encoded video data and a video decoder, namely, video decoder 30. Additionally, in accordance with the techniques described above, video decoder 30 may be an example of a video decoder configured to receive a plurality of pictures, receive, in a message associated with a first picture of the plurality of pictures, information indicating a POC value of a recovery point picture of a gradual decoder refresh (GDR) set, when a picture that follows the first picture in decoding order has the POC value that is equal to a POC value of the recovery point picture, identify the picture having the POC value equal to the POC value of the recovery point picture as a recovery point picture, and when none of the pictures that follow the first picture has the POC value that is equal to the POC value of the recovery point picture, identify one of the pictures that has a POC value greater than the POC value of the recovery point picture as the recovery point picture.

Additionally, in some examples, video decoder 30 may be further configured to, in response to identifying the picture having the POC value equal to the POC value of the recovery point picture as the recovery point picture, identify the picture having the POC value equal to the POC value of the recovery point picture as a last picture of the GDR set, and, in response to identifying the picture that has the POC value greater than the POC value of the recovery point picture as the recovery point picture, identify one of the pictures that has a POC value less than the POC value of the recovery point picture as the last picture of the GDR set. In some examples, the POC value of the picture that has the POC value less than the POC value of the recovery point picture is greater than a POC value of the first picture. In some examples, the message comprises a supplemental enhancement information (SEI) message. In one such example, the SEI message comprises a recovery point SEI message.

In some examples, the information indicating the POC value of the recovery point picture comprises information indicating a difference between a POC value of the first picture and the POC value of the recovery point picture. In some examples, the information indicating the POC value of the recovery point picture comprises the POC value of the recovery point picture. According to some examples, the video coder is further configured to decode one or more pictures of the GDR set according to GDR. According to one such example, the video coder is further configured to perform random access decoding with respect to the identified recovery point picture and one or more pictures that follow the identified recovery point picture in decoding order.

Additionally, in accordance with the techniques described above, destination device may be an example of a device for decoding video data including a memory storing encoded video data and a video coder. In these examples, video decoder 30 may be an example of a video coder configured to receive, in a message associated with a picture of the encoded video data, information indicating a refreshed region of the picture, determine whether the picture comprises a last picture in a gradual decoder refresh (GDR) set, determine whether the picture comprises a recovery point picture, and responsive to determining that the picture comprises the last picture in the GDR set and the recovery point picture, determine that the message indicates that the entire picture belongs to the refreshed region of the picture. In some examples, the message comprises a supplemental enhancement information (SEI) message. In one such example, the SEI message comprises a region refresh SEI message.

In some examples, to determine that the message indicates that the entire picture belongs to the refreshed region of the picture, the video coder may be configured to determine that a refreshed_region_flag syntax element associated with the region refresh SEI message has a value of 1. In one such example, the refreshed_region_flag syntax element is associated with a first slice segment of an access unit (AU) that includes the picture, and to determine that the entire picture belongs to the refreshed region, the video coder is configured to determine that each slice segment of the AU different from the first slice segment of the AU is associated with a corresponding refreshed_region_flag syntax element.

Figure 2:
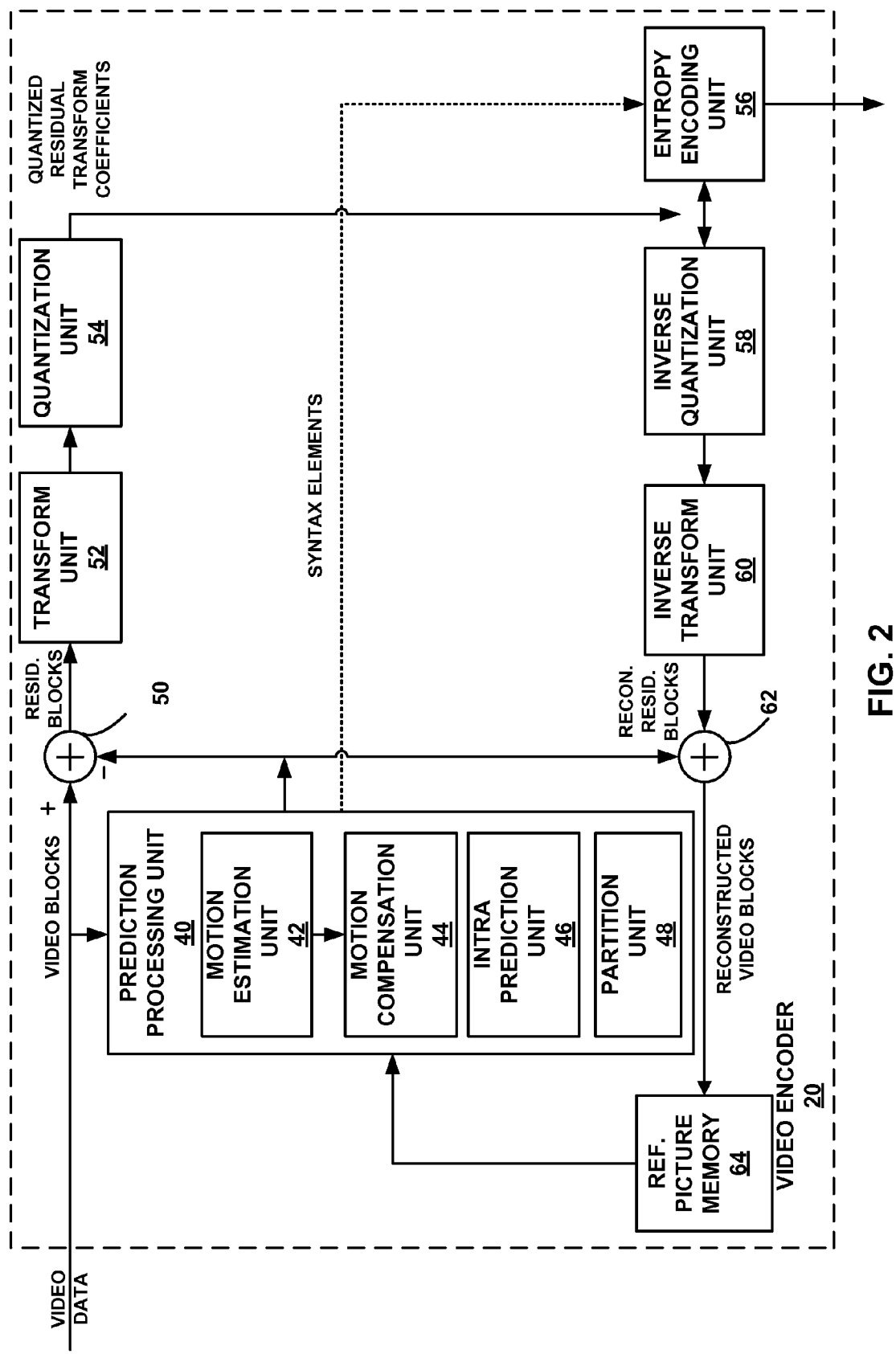
FIG. 2 is a block diagram illustrating an example video encoder that may implement one or more techniques described in this disclosure.

FIG. 2 is a block diagram illustrating an example of video encoder 20 that may implement techniques for encoding video data, in accordance with one or more aspects of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes prediction processing unit 40, reference frame memory 64, summer 50, transform processing unit 52, quantization unit 54, and entropy encoding unit 56. Prediction processing unit 40, in turn, includes motion compensation unit 44, motion estimation unit 42, and intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 62 (as an in-loop filter).

During the encoding process, video encoder 20 receives a video frame or slice to be coded. The frame or slice may be divided into multiple video blocks by prediction processing unit 40. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Prediction processing unit 40 may further produce a quadtree data structure indicative of partitioning of an LCU into sub-CUs. Leaf-node CUs of the quadtree may include one or more PUs and one or more TUs.

Prediction processing unit 40 may select one of the coding modes, intra or inter, e.g., based on error results, and provides the resulting intra- or inter-coded block to summer 50 to generate residual block data and to summer 62 to reconstruct the encoded block for use as a reference frame. Prediction processing unit 40 also provides syntax elements, such as motion vectors, intra-mode indicators, partition information, and other such syntax information, to entropy encoding unit 56. Prediction processing unit 40 may select one or more inter-modes using rate-distortion analysis.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma coding blocks, and motion compensation unit 44 uses motion vectors calculated based on the luma coding blocks for both chroma coding blocks and luma coding blocks. Prediction processing unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or prediction processing unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as code-word mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Various components of video encoder 20 may be configured to implement one or more of techniques of this disclosure to encode video data in compliance with GDR, while supporting temporal scalability of video bitstreams. For instance, video encoder 20 may implement one or more of the techniques to generate and signal one or more supplemental enhancement information (SEI) messages, such that the SEI message enables a receiving device (e.g., a video decoder or components thereof) to identify pictures in a GDR set. For instance, the receiving device may use data included in the SEI messages generated by video encoder 20 to identify a GDR picture that is the first picture, in decoding order, in the GDR set, a last picture, in decoding order, of the GDR set, and a recovery point picture. In some examples, a decoder in the receiving device may determine that the last picture ("lastPicInSet") of the GDR set is the same as the recovery point picture, while in other examples, the decoder in the receiving device may determine that lastPicInSet and the recovery point picture are separate pictures. In one example, prediction processing unit 40 may be configured to generate a recovery point SEI message and/or a region refresh information SEI message, in accordance with one or more aspects of this disclosure.

Video encoder 20 may be configured with various features, in accordance with HEVC WD 9, HEVC WD10, AVC, or other video coding standards, to include metadata in an encoded video bitstream. In various examples, video encoder 20 may include metadata that are not required by a decoder in order to decode the signaled encoded video bitstream. As some examples, video encoder 20 may signal metadata that enables a video decoder to determine picture output timing, determine display information associated with one or more pictures, detect loss information, and to conceal and/or remediate detected losses.

Additionally, video encoder 20 may generate any number of SEI network abstraction layer (NAL) units in a particular access unit (AU) signaled in the encoded video bitstream. In turn, video encoder 20 may include any number of SEI messages in a particular SEI NAL unit. As an example, Table 1 above lists various SEI messages that video encoder 20 may generate, and corresponding uses/purposes of the listed SEI messages, in accordance with HEVC WD9.

Video encoder 20 may be configured or otherwise operable to generate and signal GDR sets in an encoded video bitstream. GDR-based encoding may enable the receiving device to perform random access from a non-intra picture. Additionally, in accordance with video data encoded according to GDR, following one or more pictures in decoding order, the entire picture region can be correctly decoded at a position (e.g., at the recovery point) in the bitstream and afterwards in display/output order. GDR may provide both random accessibility and enhanced error resilience.

As described with respect to FIG. 1, a GDR set, for example, in accordance with HEVC WD9, may include a sequence of encoded pictures in decoding order. In some examples, the sequence of encoded pictures in the GDR set may also be arranged according to output order. Video encoder 20 may signal a recovery point SEI message to indicate the starting bound of the GDR set. As illustrated in syntax table 1 above, video encoder 20 may, as an example in accordance with HEVC WD9, include syntax elements such as recovery_poc_cnt, exact_match_flag, and broken_link_flag in the recovery point SEI message. In accordance with HEVC WD9, video encoder 20 may set the value of the recovery_poc_cnt syntax element to represent a difference between the POC count of the GDR picture and the recovery point picture. Additionally, video encoder 20 may signal the recovery point SEI message in the same access unit (AU) as the GDR picture. In this manner, video encoder 20 may enable the receiving device to identify the starting bound of the GDR set (e.g., the first GDR picture, which is included in the same AU as the recovery point SEI message), and the ending bound of the GDR set (e.g., by adding the value of the recovery_poc_cnt syntax element to the POC value of the GDR picture to identify the recovery point picture). In this manner, video encoder 20 may enable the receiving device to avail of one or more potential advantages provided by GDR, such as random accessibility and enhanced error resilience.

Additionally, video encoder 20 may signal a region refresh information SEI message with respect to each picture of the GDR set. For instance, video encoder 20 may include a region refresh information SEI message in each AU that includes a picture of the GDR set. Video encoder 20 may generate each region refresh information SEI message to include data indicating refreshed and/or non-refreshed regions of the corresponding picture. By signaling region refresh information SEI messages in this manner, video encoder 20 may enable the receiving device to determine the proportion of a picture that is refreshed in accordance with GDR. For instance, video encoder 20 may signal a region refresh information SEI message in the same AU as the picture to which the region refresh information SEI message corresponds. By signaling the region refresh information SEI message in this manner, video encoder 20 may enable the receiving device to determine to which picture of the GDR a particular region refresh information SEI message corresponds (in this example, the picture that is included in the same AU as the region refresh information SEI message). Additionally, the receiving device may use the data included in the region refresh information SEI message signaled by video encoder 20 to identify refreshed and/or non-refreshed regions of the corresponding picture.

As described, video encoder 20 and/or components thereof may be configured to support temporal scalability of encoded video bitstreams, such as in accordance with HEVC WD9. For instance, video encoder 20 may generate a full encoded video bitstream, from which a receiving device, such as a decoding device or intermediate device, may extract a sub-bitstream. For example, an intermediate device, such as a streaming server or a media-aware network element ("MANE") may extract a temporal subset of encoded pictures from the full set of encoded pictures included in the full encoded video bitstream, and deliver the extracted sub-bitstream to a client device having a video decoder. In some examples, the temporal subset may represent a true subset of the full set of encoded pictures included in the full encoded video bitstream. According to these examples, the full encoded video bitstream may include every encoded picture of the temporal subset, and at least one additional encoded picture that is not included in the temporal subset.

To support various picture rates in accordance with temporal scalability, an intermediate device may be configured to extract temporal subsets of different picture counts from the full set of encoded pictures included in the full encoded video bitstream. Each different temporal subset extracted by the intermediate device (e.g., to support varying picture rates) may represent an independently decodable temporal subset or sub-bitstream. In other words, a video decoder that receives a temporally scaled sub-bitstream extracted from the full encoded video bitstream may decode the temporal subset of encoded pictures without any additional data, such as information included in the full encoded video bitstream but excluded from the sub-bitstream.

A full encoded video bitstream generated by video encoder 20, in accordance with HEVC WD9, may include several temporal sub-layers. Additionally, each NAL unit generated by video encoder 20 may belong to a specific sub-layer as indicated by a corresponding "TemporalId" value. For example, video encoder 20 may set the value of the TemporalId of a NAL unit equal to the value of the corresponding "temporal_id_plus1" syntax element, minus one. Additionally, video encoder 20 may determine that all VCL NAL units of a single picture belong to a single sub-layer (i.e., the same sub-layer). In other words, video encoder 20 may encode a picture, such that the encoded picture itself belongs to the particular sub-layer corresponding to the NAL units associated with the encoded picture.

For example, in accordance with HEVC WD9, video encoder 20 may generate an encoded video bitstream such that a decoding process of a lower sub-layer of the bitstream is not dependent on data in a higher sub-layer of the bitstream. Additionally, the intermediate device may generate a sub-bitstream from a full bitstream, which conforms to HEVC WD9, by removing, from the full bitstream, all NAL units associated with a TemporalId value that is higher than a specific value. In turn, the sub-bitstream generated in this manner, may itself represent a bitstream conforming to HEVC WD9. Video encoder 20 and/or one or more components thereof may ensure that all conditions for bitstream conformance (e.g., buffer restrictions) with respect to HEVC WD9, are fulfilled for full encoded video bitstream, and for any given sub-layer thereof.

As described, in temporally scaling a full encoded video bitstream, the intermediate device may extract a temporal subset of encoded pictures from the full encoded video bitstream. For instance, the temporal subset may be a true subset of the encoded pictures signaled in the full encoded video bitstream, and therefore, the intermediate device may remove one or more encoded pictures from the full encoded bitstream to generate the sub-bitstream. In examples, the intermediate device may discard the recovery point picture identified by the recovery_poc_cnt syntax element of the recovery point SEI message. However, in these examples, the intermediate device may not be configured to update the data signaled in the recovery point SEI message, to reflect the change (i.e., removal) of the originally-indicated recovery point message. In other words, the intermediate device may potentially signal a temporal subset that includes a recovery point SEI message, but does not include the corresponding recovery point picture. In turn, by communicating a temporal subset that includes the recovery point SEI message but does not include the identified recovery point picture, the intermediate device may identify, to the video decoder, a recovery point picture that does not exist in the received temporal subset.

To mitigate or eliminate potential issues caused by temporal scaling of an encoded bitstream that includes a GDR set, techniques of this disclosure may enable a video decoding device to process the data included in the signaled SEI messages to comply with GDR, while supporting temporal scalability. For instance, the techniques may introduce changes to one or more semantics associated with the recovery point SEI message and/or the region refresh information SEI message. Changes to semantics associated with the recovery point SEI message and/or the region refresh information SEI message according to the techniques of this disclosure are described in further detail below.

Figure 3:
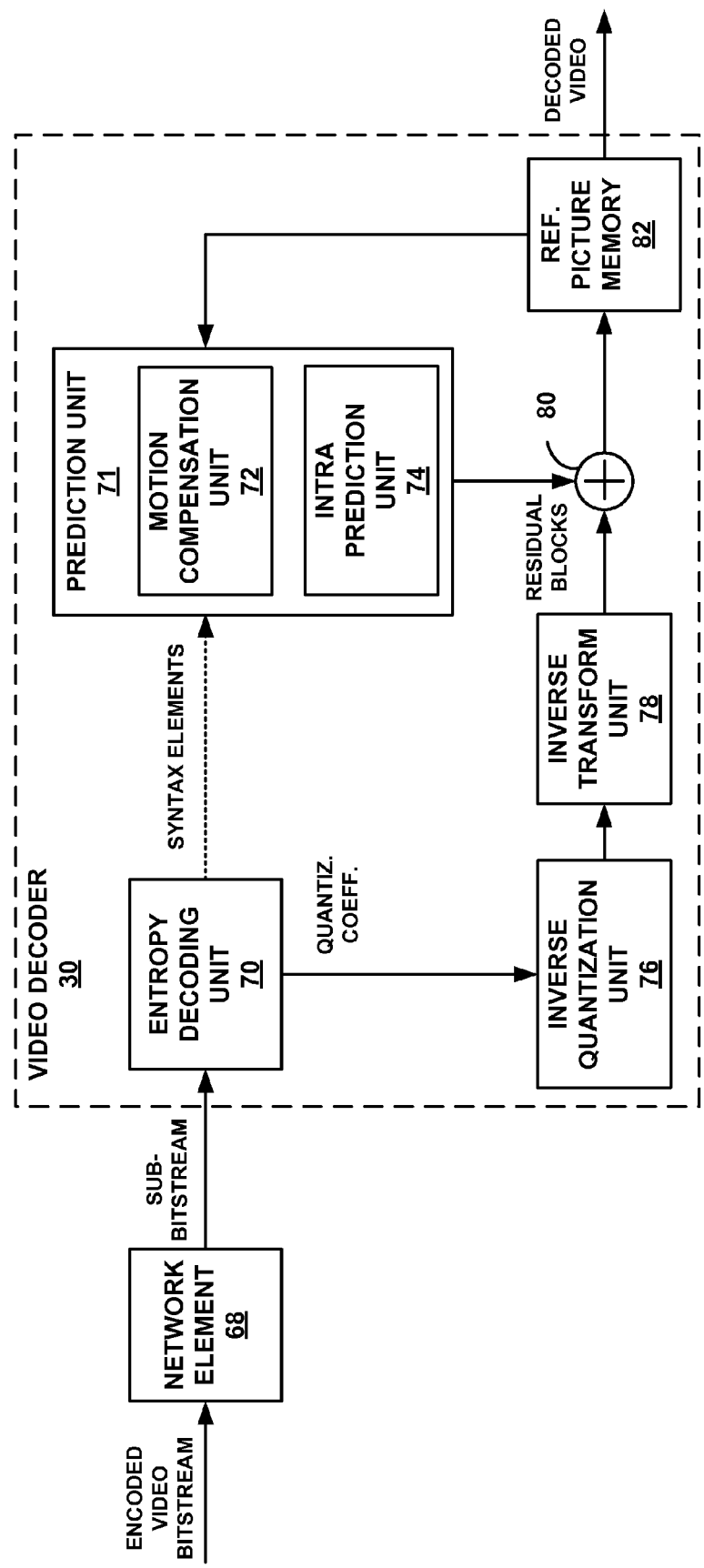
FIG. 3 is a block diagram illustrating an example video decoder that may implement one or more techniques described in this disclosure.

FIG. 3 is a block diagram illustrating an example of video decoder 30 that may implement techniques for decoding video data, in accordance with one or more aspects of this disclosure. In the example of FIG. 3, video decoder 30 includes an entropy decoding unit 70, motion compensation unit 72, intra prediction unit 74, inverse quantization unit 76, inverse transform unit 78, summer 80, and reference picture memory 82. In the example of FIG. 2, video decoder 30 includes prediction unit 71, which, in turn, includes motion compensation unit 72 and intra prediction unit 74. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra prediction unit 74 may generate prediction data based on intra-prediction mode indicators received from entropy decoding unit 70.

In the implementation illustrated in FIG. 3, video decoder 30 is coupled to a network element 68. In various examples, network element 68 may include, be, or be part of a variety of devices, such as a media-aware network element (or "MANE"), a streaming server, or a network headend device. For instance, network element 68 may be configured to receive an encoded video bitstream signaled by video encoder 20, and temporally scale the encoded video bitstream. In this example, network element 68 may relay the temporally scaled bitstream to video decoder 30.

As one example, network element 68 may extract a temporal subset of encoded pictures from the full set of encoded pictures included in the received encoded video bitstream. The encoded video bitstream received by network element 68 may be referred to herein as a "full encoded video bitstream." Additionally, the temporal subset extracted by network element 68 may represent a true subset of the full set of encoded pictures included in the full encoded video bitstream. In other words, the full encoded video bitstream received by network element 68 may include every encoded picture of the temporal subset, and at least one additional encoded picture that is not included in the temporal subset.

To support various picture rates in accordance with temporal scalability, network element 68 may be configured to extract temporal subsets of different picture counts from the full set of encoded pictures included in the full encoded video bitstream. Each different temporal subset extracted by network element 68 (e.g., to support varying picture rates) may represent an independently decodable temporal subset or sub-bitstream. In other words, a device, such as video decoder 30 that receives a temporally scaled sub-bitstream extracted by network element 68 may decode the temporal subset of encoded pictures without any additional data, such as information included in the full encoded video bitstream but excluded from the sub-bitstream.

Network element 68 may determine that a full encoded video bitstream signaled by video encoder 20, in accordance with HEVC WD9, includes several temporal sub-layers. Additionally, network element 68 may determine that each NAL unit signaled by video encoder 20 belongs to a specific sub-layer as indicated by a corresponding "TemporalId" value. For instance, network element 68 may determine that the value of the TemporalId of a NAL unit is equal to the value of the corresponding "temporal_id_plus1" syntax element, minus one. Additionally, in this example, network element 68 may determine that all VCL NAL units of a single picture belong to a single sub-layer (i.e., the same sub-layer). In other words, network element 68 may determine that a particular encoded picture itself belongs to the particular sub-layer corresponding to the NAL units associated with the encoded picture.

For example, in accordance with HEVC WD9, video encoder 20 may generate an encoded video bitstream such that a decoding process of a lower sub-layer of the bitstream (e.g., as extracted by network element 68) is not dependent on data in a higher sub-layer of the bitstream. Network element 68 may extract a sub-bitstream from a full bitstream, which conforms to HEVC WD9, by removing, from the full bitstream, all NAL units associated with a TemporalId value that is higher than a specific value. In turn, the sub-bitstream extracted by network element 68 in this manner, may itself represent a bitstream conforming to HEVC WD9. Video encoder 20 and/or one or more components thereof may ensure that all conditions for bitstream conformance (e.g., buffer restrictions) with respect to HEVC WD9, are fulfilled for each sub-bitstream.

As described, in temporally scaling a full encoded video bitstream, network element 68 may extract a temporal subset of encoded pictures from the full encoded video bitstream. For example, the temporal subset may be a true subset of the encoded pictures signaled in the full encoded video bitstream, and therefore, network element 68 may remove one or more encoded pictures from the full encoded bitstream to generate the sub-bitstream. In examples, network element 68 may remove one or more encoded pictures that are included in a GDR set. In one such example, network element 68 may discard a recovery point picture identified by a recovery point SEI message.

In one such example, however, network element 68 may not discard the GDR picture that forms the first picture of the GDR set. In this example, network element 68 may provide video decoder 30 with a recovery point SEI message, as the recovery point SEI message may be included in the same AU as the GDR picture. However, in this example, network element 68 may not provide the recovery point picture identified in the recovery point SEI message to video decoder 30, as the originally-identified recovery point picture was discarded during temporal scaling. In turn, video decoder 30 may receive an indication of a GDR set, but may be unable to locate the recovery point picture of the GDR set in the received sub-bitstream.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82, also referred to as a decoded picture buffer (DPB), also stores decoded video for later presentation on a display device, such as display device 32 of FIG. 1.

Video decoder 30, and various components thereof, may implement techniques of this disclosure to decode a coded video sequence in accordance with GDR, while supporting temporally scalable video bitstreams. As one example, entropy decoding unit 70 may implement one or more functionalities described herein with respect to video decoder 30. As described, video decoder 30 may receive an encoded video bitstream signaled by a video encoder. In various examples, video decoder 30 may receive a full encoded video bitstream, or a sub-bitstream, which network element 68 may extract, in accordance with temporal scalability. More specifically, a temporally scaled sub-bitstream may include a subset of encoded pictures extracted from the set of encoded pictures included in the full encoded video bitstream. A picture subset extracted by network element 68 in accordance with temporal scalability may be referred to herein as a "temporal subset." In some examples, the temporal subset extracted by network element 68 may represent a true subset of the encoded pictures in the full encoded video bitstream. In other words, according to these examples, the full encoded video bitstream may include every encoded picture of the temporal subset, and at least one additional encoded picture that is not included in the temporal subset.

Additionally, in accordance with HEVC WD9, AVC, or other video coding standards, video decoder 30 may be configured or otherwise operable to decode metadata included in the received encoded video bitstream. In various examples, in accordance with HEVC WD9, video decoder 30 may decode metadata that are not required for decoding the encoded pictures signaled in the encoded bitstream. In various examples, video decoder 30 may decode metadata to determine one or more of picture output timing, and display information associated with one or more pictures. In these and other examples, video decoder 30 may decode metadata to detect loss information, and to conceal and/or remediate one or more detected losses.

In some examples, e.g., in accordance with HEVC WD9, video decoder 30 may decode one or more supplemental enhancement information (SEI) network abstraction layer (NAL) units in a particular access unit (AU) signaled in the received encoded video bitstream. Additionally, video decoder 30 may decode one or more SEI messages included in a single SEI NAL unit that is signaled in the received encoded video bitstream. Table 1 above lists examples of various SEI messages that video decoder 30 may receive and decode (e.g., using entropy decoding unit 70), and corresponding uses/purposes of the listed SEI messages, in accordance with HEVC WD9.

Additionally, video decoder 30 may be configured or otherwise operable to decode GDR sets signaled in a received encoded video bitstream. More specifically, video decoder 30 may decode a received GDR set in accordance with GDR. As described with respect to FIG. 1, a GDR set, in accordance with HEVC WD9, may include a sequence of encoded pictures in decoding order. In some examples, the sequence of encoded pictures in the GDR set may also be arranged according to output order. In various examples, the last picture of the GDR set may represent a recovery point picture, in which the entire picture belongs to a refreshed region.

Video decoder 30 may decode a recovery point SEI message, such as by implementing one or more functionalities provided by entropy decoding unit 70. Based on the decoded recovery point SEI message, video decoder 30 may detect the starting bound of the GDR set, such as the first GDR picture. In various examples, the first GDR picture may be an encoded picture that is included in the same AU as the recovery point SEI message. As illustrated in syntax table 1 above, video decoder 30 may, in accordance with HEVC WD9, decode recovery_poc_cnt, exact_match_flag, and broken_link_flag syntax elements in the signaled recovery point SEI message.

In accordance with HEVC WD9, video decoder 30 may determine that the GDR set continues, until video decoder 30 detects the recovery point picture identified by the recovery point SEI message. For instance, video decoder 30 may add the value of the decoded recovery_poc_cnt syntax element to the POC value of the GDR picture to determine the POC value of the identified recovery point picture. Additionally, video decoder 30 may determine that the recovery point picture identified in this manner forms the last picture, in decoding order, of the GDR set. The last picture of a GDR set is denoted herein by "lastPicInSet."

As described, video decoder 30 and/or components thereof may be configured to support temporal scalability of encoded video bitstreams, such as in accordance with HEVC WD9. For instance, video decoder 30 may receive a sub-bitstream that network element 68 extracts from a full encoded video bitstream, and communicates to video decoder 30. In this example, network element 68 may extract a temporal subset of encoded pictures from the full set of encoded pictures included in the full encoded video bitstream, and provide the temporal subset as part of the sub-bitstream to video decoder 30. For example, the temporal subset may represent a true subset of the full set of encoded pictures included in the full encoded video bitstream. In scenarios where the temporal subset represents a true subset of the full set of encoded pictures, the full encoded video bitstream may include data for every encoded picture of the temporal subset, and data for at least one additional encoded picture that is not included in the temporal subset.

To support various temporal picture rates in accordance with temporal scalability, video decoder 30 may be configured to receive and decode sub-bitstreams of varying picture rates, such as various sub-bitstreams that network element 68 may extract from the full encoded video bitstream. More specifically, different sub-bitstreams that include temporal subsets of varying picture counts may represent different picture rates. To support temporal scalability, video decoder 30 may decode any sub-bitstream, regardless of picture rate, as an independently decodable bitstream. In other words, video decoder 30 may decode a particular temporal subset of encoded pictures without any additional data, such as information included in the full encoded video bitstream but excluded from the particular sub-bitstream.

In examples where video decoder 30 receives a full encoded video bitstream signaled by a video encoding device, the full encoded video bitstream may include one or more temporal sub-layers. Additionally, each NAL unit received and/or decoded by video decoder 30 may belong to a specific sub-layer as indicated by a corresponding "TemporalId" value. More specifically, video decoder 30 may determine the value of the TemporalId of a NAL unit to be equal to the value of the signaled corresponding "temporal_id_plus1" syntax element, minus one. Additionally, video decoder 30 may determine that all signaled VCL NAL units of a single picture belong to a single sub-layer (i.e., the same sub-layer). In other words, video decoder 30 may decode an encoded picture, based on a determination that the encoded picture itself belongs to the particular sub-layer corresponding to the NAL units associated with the encoded picture.

For example, in accordance with HEVC WD9, video decoder 30 may decode a signaled encoded video bitstream, such that a decoding process of a lower sub-layer of the bitstream is not dependent on data in a higher sub-layer of the bitstream. Network element 68 may generate a sub-bitstream from a full bitstream, by removing, from the full bitstream, all NAL units associated with a TemporalId value that is higher than a specific value. The video encoding device may ensure that all conditions for bitstream conformance (e.g., buffer restrictions) with respect to HEVC WD9, are fulfilled with respect to the full bitstream, and therefore, for each sub-bitstream that network element 68 may extract from the full bitstream. In turn, in some examples, video decoder 30 may decode any signaled sub-bitstream without any changes to the decoding process, and without necessitating any changes to hardware and/or software infrastructure. In other words, video decoder 30 may decode a signaled sub-bitstream, while supporting temporal scalability in accordance with HEVC WD9, in a manner that corresponds to decoding a full encoded video bitstream.

As described, in temporally scaling a full encoded video bitstream, network element 68 may extract a temporal subset of encoded pictures from the full encoded video bitstream. For instance, the temporal subset may be a true subset of the encoded pictures signaled in the full encoded video bitstream, and therefore, network element 68 may remove one or more encoded pictures from the full encoded bitstream to generate the sub-bitstream. In some examples, network element 68 may remove the recovery point picture identified by the recovery point SEI message. In these examples, video decoder 30 may receive a recovery point SEI message that identifies the bounds of a GDR set, but may not receive the recovery point picture that forms the lastPicInSet of the GDR set. By decoding and applying the value of the recovery_poc_cnt syntax element, video decoder 30 may determine the POC count of the identified recovery point picture, but may be unable to locate the identified recovery point picture in the received temporal subset.

To mitigate or eliminate potential issues caused by temporal scaling of a GDR set that discards an identified recovery point picture, video decoder 30 and/or components thereof, such as entropy decoding unit 70, may implement one or more techniques of this disclosure. According to some implementations of the techniques, video decoder 30 may decode the recovery point SEI message to obtain information that indicates the picture order count (POC) value of the originally-identified recovery point picture. Additionally, video decoder 30 may implement one or more techniques of this disclosure to determine whether or not the received encoded bitstream includes an encoded picture with the POC value obtained from the recovery point SEI message.

In accordance with the techniques described herein, video decoder 30 may, instead of defining the recovery point picture solely as the encoded picture with the POC value identified in the recovery point SEI message, define the recovery point picture according to a multiple-step determination. For instance, if video decoder 30 identifies that a picture ("picA") that follows the current picture (e.g. the GDR picture associated with the current SEI message) in decoding order in the received bitstream, and that has a POC value ("PicOrderCntVal") equal to the PicOrderCntVal of the GDR picture plus the value of the recovery_poc_cnt syntax element, then video decoder 30 may identify picA as the recovery point picture. On the other hand, if video decoder 30 does not identify a picA that satisfies the conditions described above, video decoder 30 may identify a picture that immediately follows picA in output order as the recovery point picture. Video decoder 30 may also determine that the recovery point picture does not precede the first GDR picture in decoding order (e.g., video decoder 30 may not identify a first picture as the recovery point picture, if the first picture has a POC value less than the POC value of the GDR picture). A GDR picture may also be referred to herein as a "current" picture.

Additionally, in accordance with one or more aspects of this disclosure, video decoder 30 may, instead of defining the GDR set ("gdrPicSet") as a set of pictures starting from a first GDR picture to the recovery point picture, define the gdrPicSet according to the following multi-step determination. If video decoder 30 identifies, in the received bitstream, a picture that follows the GDR picture in decoding order in the received bitstream (or coded video sequence) and that has PicOrderCntVal equal to the PicOrderCntVal of the GDR picture plus the value of the decoded recovery_poc_cnt syntax element signaled in the recovery point SEI message, video decoder 30 may set the picture denoted by the variable lastPicInSet as the recovery point picture. Otherwise, if video decoder 30 does not detect a picture in the coded video sequence that satisfies the conditions listed above, video decoder 30 may set the lastPicInSet to the picture that immediately precedes the recovery point picture in output order.

Additionally, video decoder 30 may determine that the picture lastPicInSet does not precede the GDR picture in decoding order. In these examples, video decoder 30 may set the gdrPicSet to be the set of pictures starting from a first GDR picture, and ending at the picture lastPicInSet, both pictures inclusive, in output order. As a result, in some examples, the refreshed region in lastPicInSet may or may not cover the entire picture. For instance, if video decoder 30 does not locate the originally-identified recovery point picture, video decoder 30 may set the lastPicInSet to a picture that precedes the originally-identified recovery point picture, and therefore determine an ending bound of the GDR set. In turn, the lastPicInSet may not be a fully-refreshed picture, as the lastPicInSet precedes the originally-identified recovery point picture in decoding order. In these examples, video decoder 30 may identify a picture that immediately follows the identified lastPicInSet as the recovery point picture with respect to the GDR set.

As described, in some examples, techniques of this disclosure may not require changes to the existing syntax of either the recovery point SEI message or the region refresh information SEI message. The techniques may, in various examples, introduce changes to the existing semantics of the recovery point SEI message and/or the region refresh information SEI message in WD9. Semantics associated with the recovery point SEI message are described below, and changes introduced to the existing semantics by the techniques described herein are underlined.

The recovery point SEI message assists video decoder 30 in determining when the decoding process will produce acceptable pictures for display after video decoder 30 initiates random access or after video encoder 20 indicates a broken link in the coded video sequence. When video decoder 30 starts the decoding process with the AU in decoding order associated with the recovery point SEI message, all decoded pictures at or subsequent to the recovery point in output order specified in this SEI message are indicated to be correct or approximately correct in content. Decoded pictures produced by random access at or before the picture associated with the recovery point SEI message need not be correct in content until the indicated recovery point or the next picture in output order, and the operation of the decoding process starting at the picture associated with the recovery point SEI message may contain references to pictures unavailable in a decoded picture buffer and/or reference picture memory 82.

In addition, by use of the broken_link_flag syntax element, video encoder 20 may use the recovery point SEI message to indicate to video decoder 30 the location of one or more pictures in the bitstream that may potentially result in visual artifacts when displayed, even when the decoding process was begun at the location of a previous random access point (RAP) AU, in decoding order. Video encoder 20 may use the broken_link_flag syntax element to indicate the location of a point after which the decoding process for the decoding of one or more pictures may cause references to pictures that, although available for use by video decoder 30 in the decoding process, are not pictures that were used for reference when the video encoder 20 originally encoded the bitstream (e.g., due to a splicing operation performed by video encoder 20 during the generation of the bitstream).

In examples where video decoder 30 performs random access to start decoding from the AU associated with the recovery point SEI message, video decoder 30 may determine that the associated picture is the first picture in the bitstream, and the variables prevPicOrderCntLsb and prevPicOrderCntMsb used in derivation of PicOrderCntVal of the recovery point picture are both set to be equal to 0. In examples where video decoder 30 determines that hypothetical reference decoder (HRD) information is present in the received bitstream, video decoder 30 may determine that a buffering period SEI message is associated with the AU associated with the recovery point SEI message in order to establish initialization of the HRD buffer model after a random access.

Any sequence or picture parameter set RBSP that is referred to by a picture associated with a recovery point SEI message or by any picture following such a picture in decoding order may be available to video decoder 30 during the decoding process prior to its activation, regardless of whether or not video decoder 30 starts the decoding process at the beginning of the bitstream or with the AU, in decoding order, that is associated with the recovery point SEI message.

The recoverypoc_cnt_syntax element may specify, to video decoder 30, the recovery point of output pictures in output order. If video decoder 30 determines that there is a picture picA that follows the current picture (e.g., the picture associated with the current SEI message) in decoding order in the coded video sequence, and that has PicOrderCntVal equal to the PicOrderCntVal of the current picture plus the value of recovery_poc_cnt, video decoder 30 may refer to the picture picA as the recovery point picture; otherwise video decoder 30 may refer to the picture that immediately follows picA in output order as the recovery point picture. Video decoder 30 may determine that the recovery point picture does not precede the current picture in decoding order. Video decoder 30 may indicate that all decoded pictures in output order are indicated to be correct or approximately correct in content starting at the output order position of the recovery point picture. Video decoder 30 may determine that the value of recovery_poc_cnt is in the range of—MaxPicOrderCntLsb/2 to MaxPicOrderCntLsb/2−1.

The exact_match_flag syntax element indicates to video decoder 30 whether one or more decoded pictures at and subsequent to the specified recovery point in output order derived by starting the decoding process at the AU associated with the recovery point SEI message will be an exact match to one or more pictures that would be produced by video decoder 30 starting the decoding process at the location of a previous RAP AU, if any, in the received bitstream. A value of 0 associated with the exact_match_flag indicates to video decoder 30 that the match may not be exact, and a value of 1 indicates that the match will be exact. When exact_match_flag is equal to 1, it is a requirement of bitstream conformance that the decoded pictures at and subsequent to the specified recovery point in output order derived by video decoder 30 by starting the decoding process at the AU associated with the recovery point SEI message are an exact match to the pictures that would be produced by starting the decoding process at the location of a previous RAP AU, if any, in the bitstream.

When performing random access, video decoder 30 may infer all references to unavailable pictures as references to pictures containing only intra coding blocks and having sample values given by Y equal to $(1<<(BitDepth_Y-1))$, Cb and Cr both equal to $(1<<(BitDepth_C-1))$ (mid-level grey), regardless of the value of exact_match_flag. When exact_match_flag is equal to 0, the quality of the approximation at the recovery point is chosen by video encoder 20 during the encoding process.

The broken_link_flag syntax element indicates, to video decoder 30, the presence or absence of a broken link in the NAL unit stream at the location of the recovery point SEI message and is assigned further semantics as follows: If broken_link_flag is equal to 1, pictures produced by video decoder 30 by starting the decoding process at the location of a previous RAP AU may contain undesirable visual artifacts to the extent that a device should not display decoded pictures at and subsequent to the access unit associated with the recovery point SEI message in decoding order until the specified recovery point in output order. Otherwise (e.g., video decoder 30 detects that broken_link_flag is equal to 0), no indication is given regarding any potential presence of visual artifacts.

In examples where the current picture is a broken link access (BLA) picture, video decoder 30 may detect that the value of broken_link_flag is equal to 1. Regardless of the value of the broken_link_flag, video decoder 30 may determine that pictures subsequent to the specified recovery point in output order are specified to be correct or approximately correct in content.

Semantics associated with the region refresh information SEI message are described below, and changes introduced to the existing semantics in WD9 by the techniques described herein are underlined.

The region refresh information SEI message indicates to video decoder 30 whether the slice segments to which the current SEI message applies belong to a refreshed region of the current picture (as described below). An AU that is not a RAP AU and that contains a recovery point SEI message is referred to herein as a gradual decoding refresh (GDR) AU, and its corresponding picture is referred to as a GDR picture. The AU corresponding to the indicated recovery point picture is referred to herein as the recovery point AU.

Video decoder 30 may determine that, if there is a picture that follows the GDR picture in decoding order in the coded video sequence and that has PicOrderCntVal equal to the PicOrderCntVal of the GDR picture plus the value of recovery_poc_cnt in the recovery point SEI message, that the variable lastPicInSet is the recovery point picture; otherwise lastPicInSet is the picture that immediately precedes the recovery point picture in output order. Video decoder 30 may determine that the picture lastPicInSet does not precede the GDR picture in decoding order.

Video decoder 30 may determine that gdrPicSet is the set of pictures starting from a GDR picture to the picture lastPicInSet, inclusive, in output order. When video decoder 30 starts the decoding process is started from a GDR AU, the refreshed region in each picture of the gdrPicSet is indicated to be the region of the picture that is correct or approximately correct in content, and, when lastPicInSet is the recovery point picture, the refreshed region in lastPicInSet covers the entire picture.

Video decoder 30 may determine that the slice segments to which a region refresh information SEI message applies consist of all slice segments within the AU that follow the SEI NAL unit containing the region refresh information SEI message and precede the next SEI NAL unit containing a region refresh information SEI message, if any, in decoding order. These slice segments are referred to herein as the slice segments associated with the region refresh information SEI message.

Additionally, video decoder 30 may determine that gdrAuSet is the set of access units corresponding to gdrPicSet. A gdrAuSet and the corresponding gdrPicSet are referred to herein as being associated with the recovery point SEI message contained in the GDR access unit. Video decoder 30 may also determine that region refresh information SEI messages shall not be present in an AU unless the AU is included in a gdrAuSet associated with a recovery point SEI message. Additionally, video decdoer 30 may determine that, when any AU that is included in a gdrAuSet contains one or more region refresh information SEI messages, all access units in the gdrAuSet shall contain one or more region refresh information SEI messages.

If the refreshed_region_flag syntax element is equal to 1, video decoder 30 may determine that the refreshed_region_flag syntax element indicates that the slice segments associated with the current SEI message belong to the refreshed region in the current picture. If video decoder 30 determines that the refreshed_region_flag syntax element is equal to 0, then video decoder 30 may determine that the refreshed_region_flag syntax element indicates that the slice segments associated with the current SEI message may not belong to the refreshed region in the current picture.

In instances where video decoder 30 detects that one or more region refresh information SEI messages are present in an AU, and the first slice segment of the AU in decoding order does not have an associated region refresh information SEI message, the video decoder 30 may infer the value of the refreshed_region_flag syntax element for the slice segments that precede the first region refresh information SEI message to be equal to 0.

When lastPicInSet is the recovery point picture, and any region refresh SEI message is included in a recovery point access unit, video decoder 30 may determine that the first slice segment of the AU in decoding order has an associated region refresh SEI message, and the value of refreshed_region_flag shall be equal to 1 in all region refresh SEI messages in the AU. In examples where video decoder 30 determines that one or more region refresh information SEI messages are present in an AU, video decoder 30 may determine that the refreshed region in the picture is specified as the set of CTUs in all slice segments of the AU that are associated with region refresh information SEI messages that have refreshed_region_flag equal to 1. Video decoder 30 may determine that other slice segments belong to the non-refreshed region of the picture.

A requirement of bitstream conformance is that, when a dependent slice segment belongs to the refreshed region, the preceding slice segment in decoding order shall also belong to the refreshed region. In examples, video decoder 30 may determine that gdrRefreshedSliceSegmentSet is the set of all slice segments that belong to the refreshed regions in the gdrPicSet. When video decoder 30 determines that a gdrAuSet contains one or more region refresh information SEI messages, it is a requirement of bitstream conformance that the following constraints all apply:

The refreshed region in the first picture included in the corresponding gdrPicSet in decoding order that contains any refreshed region shall contain only coding units (CUs) that are coded in an intra coding mode.

For each picture included in the gdrPicSet, the syntax elements in gdrRefreshedSliceSegmentSet shall be constrained such that no samples or motion vector values outside of gdrRefreshedSliceSegmentSet are used for inter prediction in the decoding process of any samples within gdrRefreshedSliceSegmentSet.

For any picture that follows the picture lastPicInSet in output order, the syntax elements in the slice segments of the picture shall be constrained such that no samples or motion vector values outside of gdrRefreshedSliceSegmentSet are used for inter prediction in the decoding process of the picture other than those of the other pictures that follow the picture lastPicInSet in output order.

As described with respect to FIG. 3, video decoder 30 and/or components thereof may perform a method of decoding video data, the method including receiving a plurality of pictures from an encoded video bitstream, receiving, from the encoded video bitstream, in a message associated with a first picture of the plurality of pictures, information indicating a picture order count (POC) value of a recovery point picture of a gradual decoder refresh (GDR) set, when a picture that follows the first picture in decoding order has the POC value that is equal to a POC value of the recovery point picture, identifying the picture having the POC value equal to the POC value of the recovery point picture as a recovery point picture, and when none of the pictures that follow the first picture has the POC value that is equal to the POC value of the recovery point picture, identifying one of the pictures that has a POC value greater than the POC value of the recovery point picture as the recovery point picture.

According to some example implementations of the method described above with respect to video decoder 30, the method further includes in response to identifying the picture having the POC value equal to the POC value of the recovery point picture as the recovery point picture, identifying the picture having the POC value equal to the POC value of the recovery point picture as a last picture of the GDR set, and, in response to identifying the picture that has the POC value greater than the POC value of the recovery point picture as the recovery point picture, identifying one of the pictures that has a POC value less than the POC value of the recovery point picture as the last picture of the GDR set. In some examples implementations, the POC value of the picture that has the POC value less than the POC value of the recovery point picture is greater than a POC value of the first picture. According to some example implementations, the message comprises a supplemental enhancement information (SEI) message. In one such example implementation, the SEI message comprises a recovery point SEI message.

In some example implementations of the method described above with respect to video decoder 30, the information indicating the POC value of the recovery point picture comprises information indicating a difference between a POC value of the first picture and the POC value of the recovery point picture. According to some example implementations, the information indicating the POC value of the recovery point picture comprises the POC value of the recovery point picture. In some example implementations, the method described above with respect to video decoder 30 further includes decoding one or more pictures of the GDR set according to GDR. According to one such example implementation, the method further includes performing random access decoding with respect to the identified recovery point picture and one or more pictures that follow the identified recovery point picture in decoding order.

Additionally, video decoder 30 and/or components thereof may perform a method of decoding video data, the method including receiving, in a message associated with a picture, information indicating a refreshed region of the picture, determining whether the picture comprises a last picture in a gradual decoder refresh (GDR) set, determining whether the picture comprises a recovery point picture, and responsive to determining that the picture comprises the last picture in the GDR set and the recovery point picture, determining that the message indicates that the entire picture belongs to the refreshed region of the picture. In some example implementations of the method described above with respect to video decoder 30, the message comprises a supplemental enhancement information (SEI) message. In one such example implementation, the SEI message comprises a region refresh SEI message.

In some example implementations of the method described above with respect to video decoder 30, determining that the message indicates that the entire picture belongs to the refreshed region of the picture comprises determining that a refreshed_region_flag syntax element associated with the region refresh SEI message has a value of 1. In one such example implementation, the refreshed_region_flag syntax element is associated with a first slice segment of an access unit (AU) that includes the picture, and determining that the entire picture belongs to the refreshed region further comprises determining that each slice segment of the AU different from the first slice segment of the AU is associated with a corresponding refreshed_region_flag syntax element.

In various examples, video decoder 30 may be included in a device for coding video data, such as a desktop computer, notebook (i.e., laptop) computer, tablet computer, set-top box, telephone handset such as a so-called "smart" phone, so-called "smart" pad, television, camera, display device, digital media player, video gaming console, video streaming device, or the like. In examples, such a device for coding video data may include one or more of an integrated circuit, a microprocessor, and a communication device that includes video decoder 30.

Figure 4:
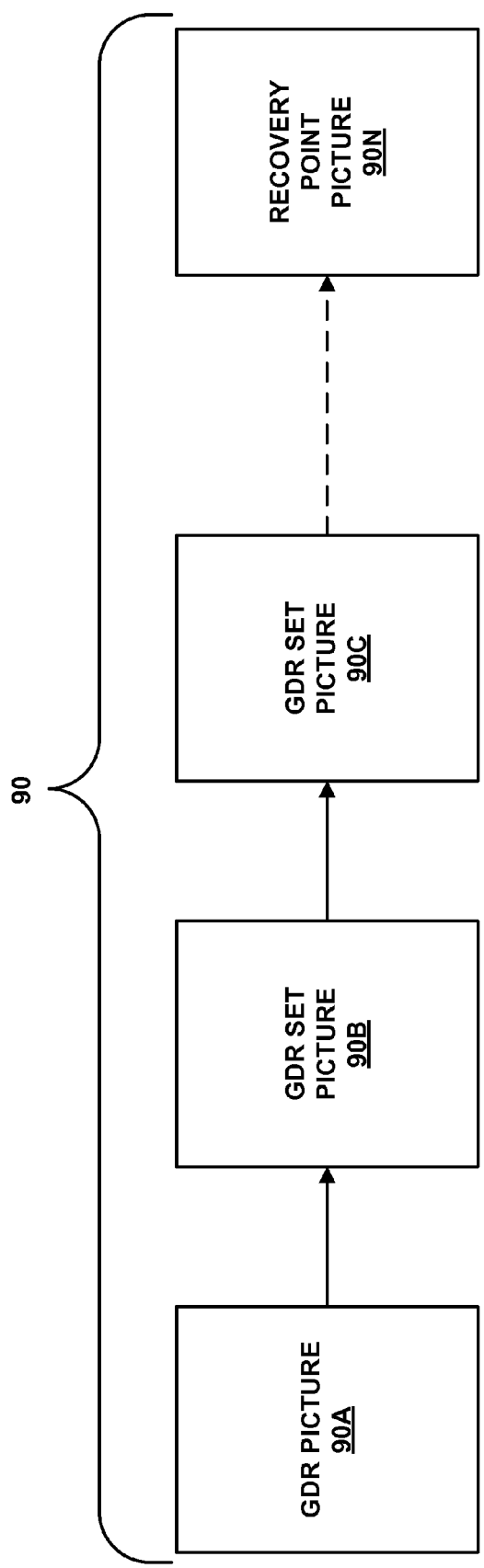
FIG. 4 is a conceptual diagram illustrating an example gradual decoding refresh (GDR) set that includes a recovery point picture, in accordance with one or more aspects of this disclosure.

FIG. 4 is a conceptual diagram illustrating an example gradual decoding refresh (GDR) set 90 that includes a first GDR picture 90A, GDR set pictures 90B, 90C, etc., and recovery point picture 90N, in accordance with one or more aspects of this disclosure. Although techniques described herein with respect to GDR set 90 may be performed by a variety of devices, for ease of discussion purposes only, FIG. 4 is described herein with respect to video decoder 30 of FIGS. 1 and 3. Video decoder 30 may detect that an access unit (AU) that includes GDR picture 90A also includes a recovery point SEI message. Based on detecting the recovery point SEI message associated with GDR picture 90A, video decoder 30 may determine that GDR picture 90A forms the first picture of a GDR set signaled in the received encoded video bitstream.

Additionally, video decoder 30 may apply the value of a recovery_poc_cnt syntax element included in the recovery point SEI message to obtain the POC count of recovery point picture 90N. For instance, video decoder 30 may add the value of the recovery_poc_cnt syntax element to the picture order count (POC) value of GDR picture 90A, to obtain the POC value of recovery point picture 90N. In the example of GDR set 90, video decoder 30 may locate a picture, namely recovery point picture 90N, that has the POC value derived by video decoder 30 from the recovery_poc_cnt syntax element. For instance, even if GDR set 90 is included in a temporal subset extracted by network element 68, GDR set may still include recovery point picture 90N identified by the recovery point SEI message. In other words, in the example of GDR set 90, recovery point picture 90N was not discarded due to temporal scaling.

Based on detecting recovery point picture 90N using the value of the recovery_poc_cnt syntax element, video decoder 30 may implement techniques of this disclosure to determine that the entirety of recovery point picture 90N belongs to a refreshed region, and that recovery point picture 90N is the lastPicInSet with respect to GDR set 90.

Figure 5:
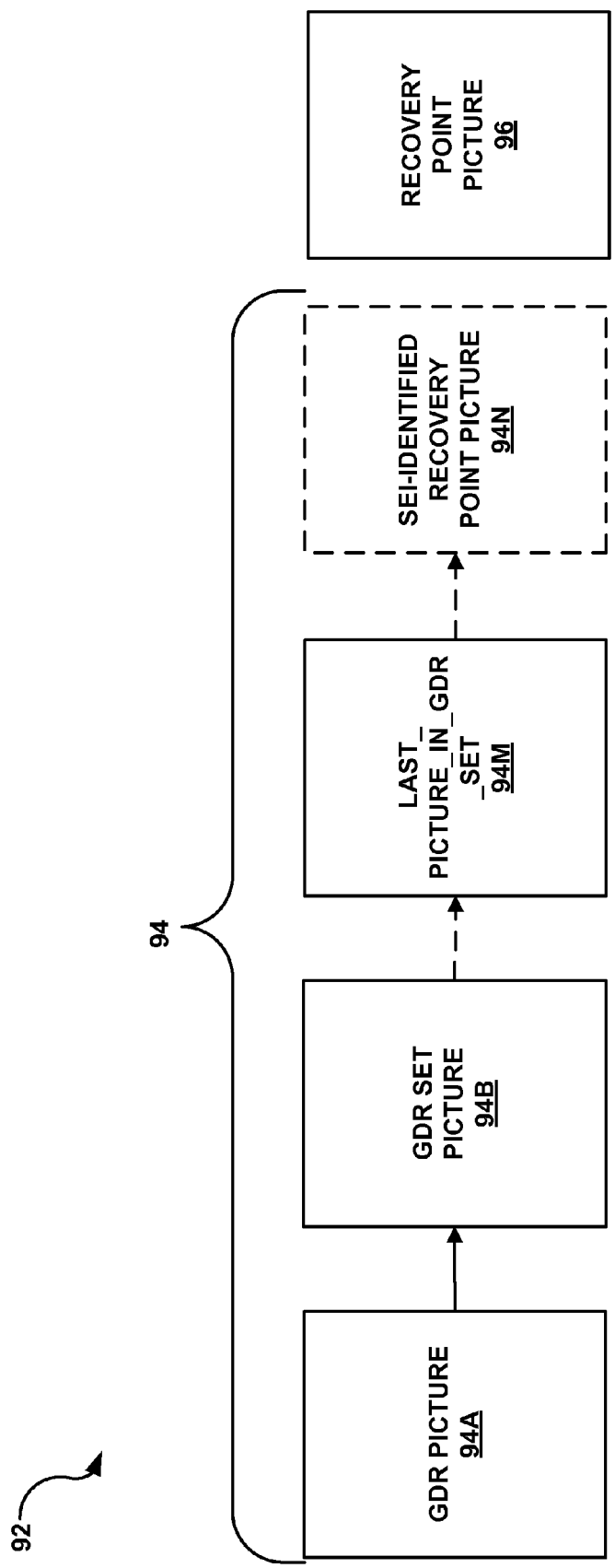
FIG. 5 is a conceptual diagram illustrating an example gradual decoding refresh (GDR) set from which a recovery point picture has been removed due to temporal scaling, in accordance with one or more aspects of this disclosure.

FIG. 5 is a conceptual diagram illustrating an example gradual decoding refresh (GDR) set 94 from which a recovery point picture 94N has been removed due to temporal scaling, in accordance with one or more aspects of this disclosure. GDR set 94 includes first GDR picture 94A, GDR set picture 94B, one or more additional GDR set pictures, and a last GDR set picture 94M. The letters used to label GDR set pictures are not intended to indicate particular number of pictures in the GDR set, but to serve as labels. Although techniques described herein with respect to GDR set 90 may be performed by a variety of devices, for ease of discussion purposes only, FIG. 5 is described herein with respect to video decoder 30 of FIGS. 1 and 3. In the example of GDR set 94, network element 68 may have discarded the recovery point picture identified in the recovery point SEI message (e.g., SEI-identified recovery point picture 94N) during temporal scaling. SEI-identified recovery point picture 94N is illustrated with dashed-line borders to indicate that SEI-identified recovery point picture 94N was present in a higher temporal layer, but does not exist in the lower temporal layer received by video decoder 30.

In the example of coded video sequence 92 of FIG. 5, video decoder 30 may use the recovery_poc_cnt to determine that the recovery point SEI message identifies SEI-identified recovery point picture 94N as the recovery point picture of GDR set 94. However, because SEI-identified recovery point picture 94N has been discarded during temporal scaling, video decoder 30 may be unable to locate SEI-identified recovery point picture 94N in the received temporal subset. In turn, video decoder 30 may implement one or more techniques of this disclosure to support GDR-based decoding of GDR set 94, while supporting temporally scalable bitstreams.

For instance, video decoder 30 may locate the first picture, in decoding order, of coded video sequence 92, that has a POC value greater than the POC value derived with respect to SEI-identified recovery point picture 94N. Additionally, video decoder 30 may implement one or more techniques described herein to identify the located picture as the recovery point picture with respect to GDR set 94. In the example of FIG. 5, video decoder 30 may identify recovery point picture 96 as the first picture of coded video sequence 92 that has a POC value greater than the POC value of SEI-identified recovery point picture 94N. For instance, by identifying recovery point picture 96 as the recovery point picture with respect to GDR set 94, video decoder 30 may determine that the entirety of recovery point picture 96 belongs to a refreshed region, for random access and error resilience in the decoding coded video sequence 92.

Additionally, video decoder 30 may identify the picture that immediately precedes recovery point picture 96 in coded video sequence 92, as the lastPicInSet of GDR set 94. For instance, in response to being unable to locate SEI-identified recovery point picture 94N in coded video sequence 92, video decoder 30 may implement techniques of this disclosure to identify last_picture_in_GDR_set 94M as the lastPicInSet of GDR set 94. In this example, video decoder 30 may identify two separate pictures, that are consecutive in decoding order within coded video sequence 92, as the lastPicInSet (94M) and the recovery point picture (96) with respect to GDR set 94. Additionally, in this example, the recovery point picture identified by video decoder 30 may not be included in GDR set 94. FIG. 5 illustrates one example in which video decoder 30 may implement techniques of this disclosure to identify a lastPicInSet and a recovery point picture for GDR set 94, even if SEI-identified recovery point picture 94N was discarded due to temporal scaling. In this manner, FIG. 5 illustrates an example in which video decoder 30 may implement techniques of this disclosure to decode GDR set 94 in accordance with GDR as described in HEVC WD9, while supporting temporal scalability of encoded video bitstreams.

Figure 6:
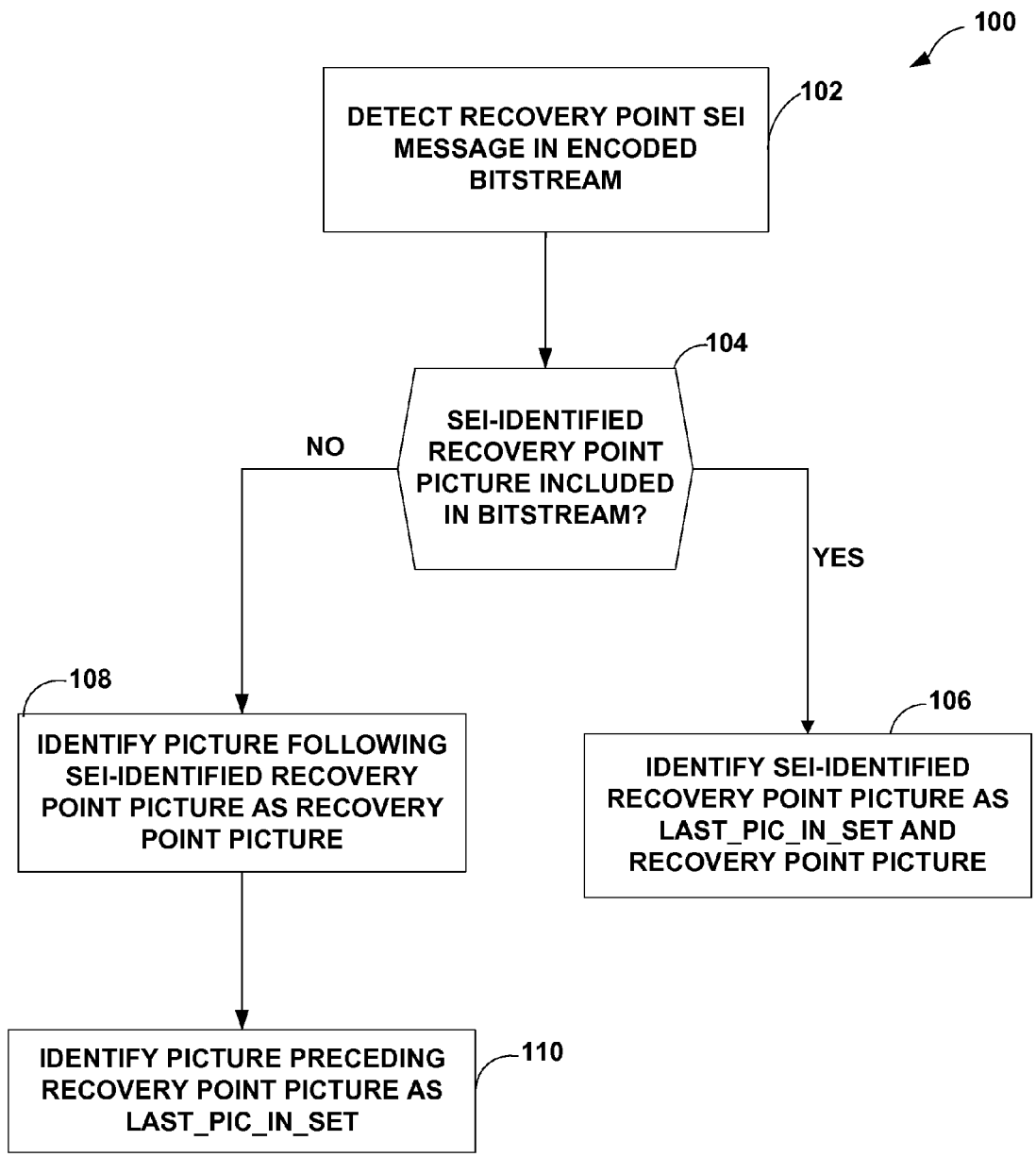
FIG. 6 is a flowchart illustrating an example process that a video decoder and/or components thereof may perform to decode encoded video data, in accordance with one or more aspects of this disclosure.

FIG. 6 is a flowchart illustrating an example process 100 that video decoder 30 and/or components thereof may perform to decode encoded video data, in accordance with one or more aspects of this disclosure. Process 100 may begin when video decoder 30 detects a recovery point SEI message in a received encoded video bitstream (102). For instance, video decoder 30 may detect the recovery point SEI message in a GDR access unit, which also includes data associated with an encoded GDR picture, such as the first GDR picture of the GDR set. Based on detecting the recovery point SEI message in the GDR access unit, video decoder 30 may determine that the GDR picture included in the GDR access unit forms the first picture of a GDR set.

Additionally, video decoder 30 may determine whether a recovery point picture identified in the recovery point SEI message is included in the received encoded video bitstream (104). For instance, video decoder 30 may add a value of a recovery_poc_cnt syntax element of the recovery point SEI message to the POC value of the GDR picture, to obtain the POC value of the SEI-identified recovery point picture. In one example, video decoder may using the derived POC value to traverse the received coded video sequence, to determine whether a picture of the sequence has the derived POC value. For instance, video decoder 30 may traverse the coded video sequence in decoding order. In this example, if video decoder 30 reaches a picture with the derived POC value, video decoder 30 may determine that the SEI-identified recovery point picture is included in the received coded video sequence. On the other hand, in this example, if video decoder 30 reaches a picture with a greater POC value than the derived POC value, but has not yet located a picture with the derived POC value, then video decoder 30 may determine that the SEI-identified recovery point picture is not included in the received encoded video bitstream.

If video decoder 30 determines that the SEI-identified recovery point picture is included in the received bitstream ('YES' branch of 104), video decoder may identify the SEI-identified recovery point picture as both the last picture in the GDR set (lastPicInSet) and as the recovery point picture for the GDR set (106). In this scenario, video decoder 30 may determine that the lastPicInSet and the recovery point picture are the same picture, and that the recovery point picture is included in the GDR set.

On the other hand, if video decoder 30 determines that the SEI-identified recovery point picture is not included in the received video bitstream (NO' branch of 104), then video decoder 30 may identify a picture that follows the SEI-identified recovery point picture, as the recovery point picture for the GDR set (108). For instance, video decoder 30 may identify the recovery picture as the first picture, in decoding order, of the received video bitstream that has a POC value greater than the POC value derived with respect to the SEI-identified recovery point picture.

Additionally, in this scenario, video decoder 30 may identify a picture of the received coded video sequence that immediately precedes the identified recovery point picture in decoding order, i.e., the last picture having a POC value less than the POC value derived with respect to the SEI-identified recovery point picture, as the lastPicInSet of the GDR set (110). In this example, video decoder 30 may identify two separate pictures, which are consecutive in decoding order, as the lastPicInSet and the recovery point picture with respect to the GDR set. Additionally, in this example, video decoder 30 may determine that the lastPicInSet is included in the GDR set, and that the recovery point picture is not included in the GDR set. For instance, video decoder 30 may determine that the recovery point picture is the first picture, in decoding order, that follows the GDR set in the received encoded video bitstream.

In this manner, video decoder 30 may be an example of a device for coding video data, the device including means for receiving a plurality of pictures from an encoded video bitstream, means for receiving, from the encoded video bitstream, in a message associated with a first picture of the plurality of pictures, information indicating a POC value of a recovery point picture of a gradual decoder refresh (GDR) set, means for identifying, when a picture that follows the first picture in decoding order has the POC value that is equal to a POC value of the recovery point picture, the picture having the POC value equal to the POC value of the recovery point picture as a recovery point picture, and means for identifying, when none of the pictures that follow the first picture has the POC value that is equal to the POC value of the recovery point picture, one of the pictures that has a POC value greater than the POC value of the recovery point picture as the recovery point picture.

In some examples, the device may further include means for, in response to identifying the picture having the POC value equal to the POC value of the recovery point picture as the recovery point picture, identifying the picture having the POC value equal to the POC value of the recovery point picture as a last picture of the GDR set, and means for, in response to identifying the picture that has the POC value greater than the POC value of the recovery point picture as the recovery point picture, identifying one of the pictures that has a POC value less than the POC value of the recovery point picture as the last picture of the GDR set. According to some examples, the POC value of the picture that has the POC value less than the POC value of the recovery point picture is greater than a POC value of the first picture.

In some examples, the message comprises a recovery point supplemental enhancement information (SEI) message. According to some examples, the POC value of the picture that has the POC value less than the POC value of the recovery point picture is greater than a POC value of the first picture. According to some examples, the information indicating the POC value of the recovery point picture comprises information indicating a difference between a POC value of the first picture and the POC value of the recovery point picture. According to some examples, the information indicating the POC value of the recovery point picture comprises the POC value of the recovery point picture. In some examples, the device may further include means for performing random access decoding with respect to the identified recovery point picture and one or more pictures that follow the identified recovery point picture in decoding order.

Additionally, in this manner, destination device 14 of FIG. 1 may be an example of a computing device that includes or is coupled to a computer-readable storage medium having stored thereon instructions that, when executed, cause a processor of the computing device to receive a plurality of pictures from an encoded video bitstream, receive, from the encoded video bitstream, in a message associated with a first picture of the plurality of pictures, information indicating a POC value of a recovery point picture of a gradual decoder refresh (GDR) set, when a picture that follows the first picture in decoding order has the POC value that is equal to a POC value of the recovery point picture, identify the picture having the POC value equal to the POC value of the recovery point picture as a recovery point picture, and when none of the pictures that follow the first picture has the POC value that is equal to the POC value of the recovery point picture, identify one of the pictures that has a POC value greater than the POC value of the recovery point picture as the recovery point picture.

In some examples, the computer-readable storage medium may have stored thereon instructions that, when executed, further cause the processor of the computing device to, in response to identifying the picture having the POC value equal to the POC value of the recovery point picture as the recovery point picture, identify the picture having the POC value equal to the POC value of the recovery point picture as a last picture of the GDR set, and in response to identifying the picture that has the POC value greater than the POC value of the recovery point picture as the recovery point picture, identify one of the pictures that has a POC value less than the POC value of the recovery point picture as the last picture of the GDR set. In some examples, the message comprises a recovery point supplemental enhancement information (SEI) message. According to some examples, the POC value of the picture that has the POC value less than the POC value of the recovery point picture is greater than a POC value of the first picture.

In some examples, the message comprises a supplemental enhancement information (SEI) message. In one such example, the SEI message comprises a region refresh SEI message. According to some examples, the information indicating the POC value of the recovery point picture comprises information indicating a difference between a POC value of the first picture and the POC value of the recovery point picture. According to some examples, the information indicating the POC value of the recovery point picture comprises the POC value of the recovery point picture. In some examples, the computer-readable storage medium may have stored thereon instructions that, when executed, further cause the processor of the computing device to perform random access decoding with respect to the identified recovery point picture and one or more pictures that follow the identified recovery point picture in decoding order.

Figure 7:
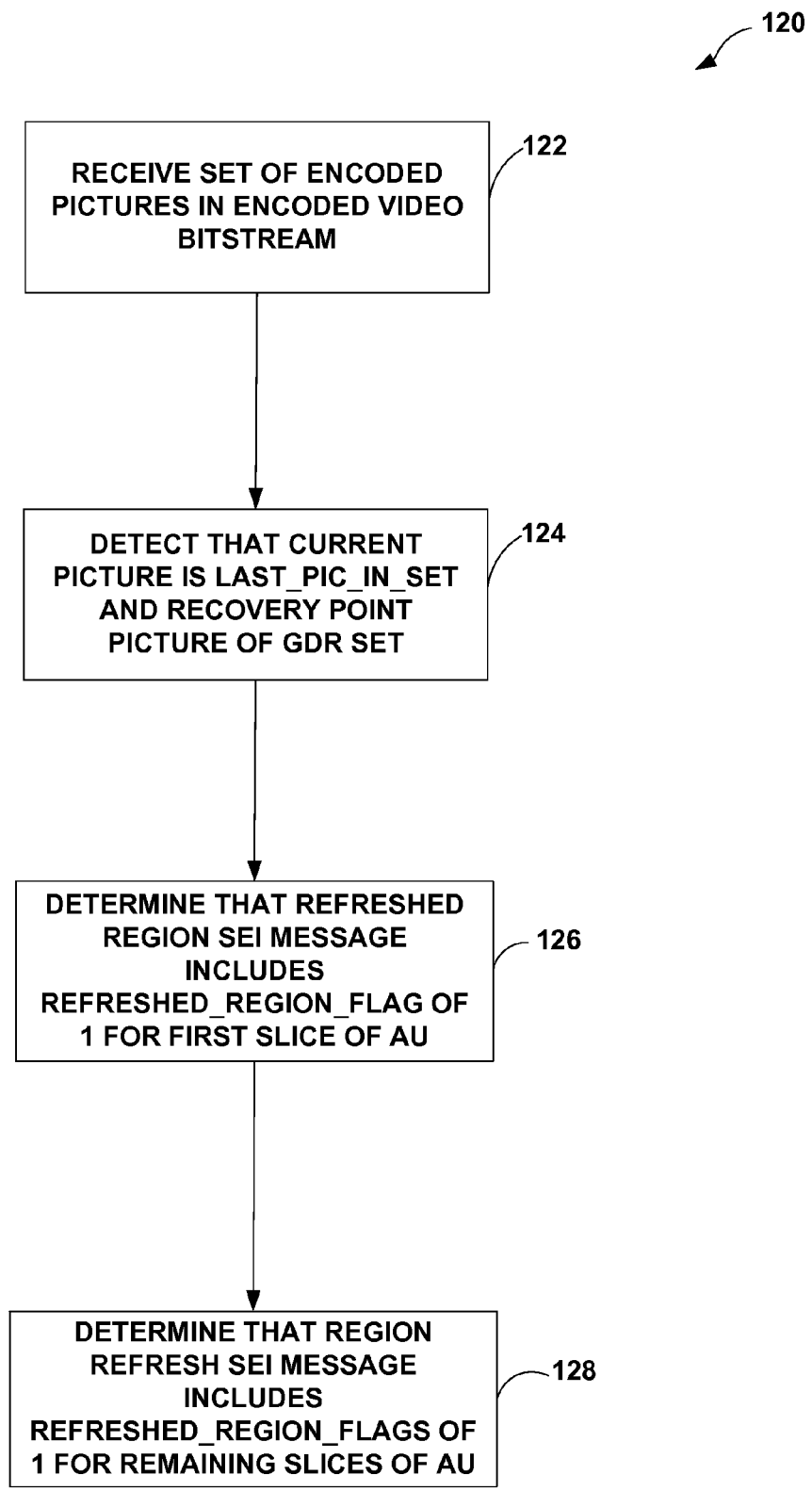
FIG. 7 is a flowchart illustrating an example process that a video decoder and/or components thereof may perform to decode encoded video data, in accordance with one or more aspects of this disclosure.

FIG. 7 is a flowchart illustrating an example process 120 that video decoder 30 and/or components thereof may perform to decode encoded video data, in accordance with one or more aspects of this disclosure. Process 120 may begin when video decoder 30 receives a set of one or more encoded pictures in an encoded video bitstream (122). In various examples, the received set of encoded pictures may include, be, or be part of a GDR set.

Video decoder 30 may detect that a current picture of the received set is both the lastPicInSet of the GDR set, and is a recovery point picture (124). As one example, video decoder 30 may determine that the current picture has a POC value that matches the POC value indicated by a most recently-received recovery point SEI message in the encoded video bitstream. In this example, based on the POC value of the current picture matching the POC value indicated in the most recently-received recovery point SEI message, video decoder 30 may determine that the current picture is both the lastPicInSet of the GDR set, as well as a recovery point picture.

Additionally, video decoder 30 may determine that the received region refresh SEI message includes a refreshed_region_flag set to a value of 1, for a first slice segment of the AU that includes the current picture (126). For instance, video decoder 30 may decode the region refresh SEI message associated with the current picture to obtain a refreshed_region_flag corresponding to each slice segment of the current picture. In some examples, video decoder 30 may decode the region refresh SEI message to obtain the refreshed_region_flags of the AU in sequential slice order, i.e., starting with decoding the first slice of the AU, then decoding the second slice of the AU, and so on. As a result, in examples of sequentially obtaining the refreshed_region_flags of the AU, video decoder 30 may obtain the refreshed_region_flag for the first slice segment prior to obtaining the refreshed_region_flags for the remaining slice segments of the AU.

Based on determining that the current picture is the lastPicInSet and a recovery point picture (124), and that the refreshed_region_flag for the first slice of the AU is set to a value of 1 (126), video decoder 30 may determine that the region refresh SEI message includes refreshed_region_flags set to a value of 1 for all remaining slices of the AU (128). For instance, based on the first slice of the AU being set to the value of 1, and based on determining that the current picture is the lastPicInSet and a recovery point picture, video decoder 30 may determine that the current picture is a fully refreshed picture. In other words, in this example, video decoder 30 may determine that the entirety of the current picture belongs to the refreshed region of the current picture. In turn, based on determining that the current picture is a fully refreshed picture, video decoder 30 may infer the values of the refreshed_region_flags corresponding to all slices of the AU to be set to a value of 1.

In this manner, video decoder 30 may implement the techniques of this disclosure to determine that the values of all refreshed_region_flags included in the region refresh SEI message (for the AU including the current picture) are set to a value of 1, in instances where video decoder 30 determines that the current picture is fully refreshed. For example, video decoder may decode the refreshed_region_flag for the first slice of the AU to obtain a value of 1. Based on the value of the refreshed_region_flag for the first slice having a value of 1, and the current picture being the lastPicInSet and a recovery point picture, video decoder 30 may infer the values of the refreshed_region_flags of the remaining slices of the AU to have values of 1, thereby representing a fully refreshed picture. By inferring the values of the remaining refreshed_region_flags to have values of 1 in the case of a fully refreshed picture, video decoder 30 may conserve computing resources in the decoding process, while maintaining decoding accuracy with respect to the fully refreshed picture.

In this manner, video decoder 30 may be an example of a device for decoding video data, the device including means for receiving, in a message associated with a picture, information indicating a refreshed region of the picture, means for determining whether the picture comprises a last picture in a gradual decoder refresh (GDR) set, means for determining whether the picture comprises a recovery point picture, means for, responsive to determining that the picture comprises the last picture in the GDR set and the recovery point picture, determining that the message indicates that the entire picture belongs to the refreshed region of the picture, and means for decoding the picture based on the determination that the message indicates that the entire picture belongs the refreshed region of the picture. In some examples, the message comprises a supplemental enhancement information (SEI) message. In one such example, the SEI message comprises a region refresh SEI message.

In some examples, the means for determining that the message indicates that the entire picture belongs to the refreshed region of the picture include means for determining that a refreshed_region_flag syntax element associated with the region refresh SEI message has a value of 1. In one such example, the refreshed_region_flag syntax element is associated with a first slice segment of an access unit (AU) that includes the picture, and the means for determining that the entire picture belongs to the refreshed region further includes means for determining that each slice segment of the AU different from the first slice segment of the AU is associated with a corresponding refreshed_region_flag syntax element.

In this manner, video decoder 30 may be an example of a device for decoding video data, the device including means for receiving from an encoded video bitstream a message associated with a picture, the message including information indicating a refreshed region of the picture, means for determining whether the picture comprises a last picture in a gradual decoder refresh (GDR) set, means for determining whether the picture comprises a recovery point picture, means for, responsive to determining that the picture comprises the last picture in the GDR set and the recovery point picture, determining that the message indicates that the entire picture belongs to the refreshed region of the picture, and means for decoding the picture based on the determination that the message indicates that the entire picture belongs the refreshed region of the picture. In some examples, the message comprises a supplemental enhancement information (SEI) message. In one such example, the SEI message comprises a region refresh SEI message.

In some examples, the instructions that cause the processor of the computing device to determine that the message indicates that the entire picture belongs to the refreshed region of the picture include instructions that cause the processor of the computing device to determine that a refreshed_region_flag syntax element associated with the region refresh SEI message has a value of 1. In one such example, the refreshed_region_flag syntax element is associated with a first slice segment of an access unit (AU) that includes the picture, and the instructions that cause the processor of the computing device to determine that the entire picture belongs to the refreshed region further include instructions that cause the processor of the computing device to determine that each slice segment of the AU different from the first slice segment of the AU is associated with a corresponding refreshed_region_flag syntax element.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, various computer-readable storage devices, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving, in a recovery point supplemental enhancement information (SEI) message contained within an access unit (AU) that corresponds to a first picture, information indicative of a picture order count (POC) value of a recovery point picture, the recovery point picture having a refreshed region that is one of correct in content or approximately correct in content, the refreshed region of the recovery point picture including an entirety of the recovery point picture; and
   based on a determination that no picture that follows the first picture, in decoding order, has a POC value that is equal to the POC value of the recovery point picture as indicated in the recovery point SEI message, determining that a next picture, in decoding order, that has a POC value greater than the POC value of the recovery point picture, is the recovery point picture.

2. The method of claim 1, further comprising:
   in response to determining that no picture that follows the first picture, in decoding order, has the POC value that is equal to the POC value of the recovery point picture as indicated in the recovery point SEI message, determining that a picture that immediately precedes the recovery point picture is the last picture, in output order, of a gradual decoder refresh (GDR) set of pictures.

3. The method of claim 2, wherein the last picture does not precede the first picture in decoding order.

4. The method of claim 1, wherein the information indicative of the POC value of the recovery point picture comprises information indicative of a difference between a POC value of the first picture and the POC value of the recovery point picture.

5. The method of claim 1, further comprising producing, based on an initiation of random access decoding starting at the access unit associated with the recovery point SEI message, decoded pictures, at or subsequent to the recovery point picture, that are indicated to be correct in content or approximately correct in content.

6. A device for decoding video data, the device comprising:
   a memory configured to store encoded video data; and
   a video decoding device configured to:
     receive, in a recovery point supplemental enhancement information (SEI) message contained within an access unit (AU) that corresponds to a first picture, information indicative of a picture order count (POC) value of a recovery point picture, the recovery point picture having a refreshed region that is one of correct in content or approximately correct in content, the refreshed region of the recovery point picture including an entirety of the recovery point picture;
     based on a determination that a second picture that follows the first picture, in decoding order, has a POC value that is equal to the POC value of the recovery point picture as indicated in the recovery point SEI message, determine that the second picture having the POC value equal to the POC value of the recovery point picture is the recovery point picture; and
     based on a determination that no picture that follows the first picture, in decoding order, has a POC value that is equal to the POC value of the recovery point picture as indicated in the recovery point SEI message, determine that a next picture, in decoding order, that has a POC value greater than the POC value of the recovery point picture is the recovery point picture.

7. The device of claim 6, wherein the one or more processors are further configured to:
   in response to the determination that the second picture having the POC value equal to the POC value of the recovery point picture, as indicated in the recovery point SEI message, is the recovery point picture, determine that the second picture is a last picture, in decoding order, among a gradual decoder refresh (GDR) set of pictures; and
   in response to the determination that no picture that follows the first picture, in decoding order, has the POC value that is equal to the POC value of the recovery point picture as indicated in the recovery point SEI message, determine that a picture that immediately precedes the recovery point picture is the last picture, in output order, of the GDR set.

8. The device of claim 7, wherein the last picture does not precede the first picture in decoding order.

9. The device of claim 6, wherein the information indicative of the POC value of the recovery point picture comprises information indicative of a difference between a POC value of the first picture and the POC value of the recovery point picture.

10. The device of claim 6, wherein the video decoding device is further configured to produce, based on an initiation of random access decoding starting at the access unit associated with the recovery point SEI message, decoded pictures, at or subsequent to the recovery point picture, that are indicated to be correct in content or approximately correct in content.

11. The device of claim 6, further comprising a display device configured to display reconstructed video data.

12. The device of claim 6, further comprising at least one of:
   one or more integrated circuits;
   one or more microprocessors;
   one or more digital signal processors (DSPs);
   one or more field programmable gate arrays (FPGAs);
   a desktop computer;
   a laptop computer;
   a tablet computer;
   a phone;
   a television;
   a camera;
   a display device;
   a digital media player;
   a video game console;
   a video game device;
   a video streaming device; or
   a wireless communication device.

13. A non-transitory computer-readable storage medium having stored thereon instructions that, when executed, cause one or more processors of a video decoding device to:
   receive, in a recovery point supplemental enhancement information (SEI) message contained within an access unit (AU) that corresponds to a first picture, information indicative of a picture order count (POC) value of a recovery point picture, the recovery point picture having a refreshed region that is one of correct in content or approximately correct in content, the refreshed region of the recovery point picture including an entirety of the recovery point picture;
   based on a determination that a second picture that follows the first picture, in decoding order, has a POC value that is equal to the POC value of the recovery point picture as indicated in the recovery point SEI message, determine that the second picture having the POC value equal to the POC value of the recovery point picture is the recovery point picture; and
   based on a determination that no picture that follows the first picture, in decoding order, has a POC value that is equal to the POC value of the recovery point picture as indicated in the recovery point SEI message, determine that a next picture, in decoding order, of the plurality of pictures that has a POC value greater than the POC value of the recovery point picture, is the recovery point picture.

14. The non-transitory computer-readable storage medium of claim 13, further having stored thereon instructions that, when executed, cause the one or more processors of the video decoding device to:
   determine, in response to the determination that the second picture having the POC value equal to the POC value of the recovery point picture, as indicated in the recovery point SEI message, is the recovery point picture, determine that the second picture is a last picture, in decoding order, among a gradual decoder refresh (GDR) set of pictures; and
   determine, in response to the determination that no picture that follows the first picture, in decoding order, has the POC value that is equal to the POC value of the recovery point picture as indicated in the recovery point SEI message, that a picture that immediately precedes the recovery point picture is the last picture, in output order, of the GDR set.

15. The non-transitory computer-readable storage medium of claim 13, wherein the information indicative of the POC value of the recovery point picture comprises information indicative of a difference between a POC value of the first picture and the POC value of the recovery point picture.

16. The non-transitory computer-readable storage medium of claim 13, further having stored thereon instructions that, when executed, cause the one or more processors of the video decoding device to produce, based on an initiation of random access decoding starting at the access unit associated with the recovery point SEI message, decoded pictures, at or subsequent to the recovery point picture, that are indicated to be correct in content or approximately correct in content.

17. A device for decoding video data, the device comprising:
   means for receiving, from the encoded video bitstream, a recovery point supplemental enhancement information (SEI) message contained within an access unit (AU) that corresponds to a first picture, indicative of a picture order count (POC) value, the recovery point picture having a refreshed region that is one of correct in content or approximately correct in content, the refreshed region of the recovery point picture including an entirety of the recovery point picture;
   means for determining, based on a determination that a second picture that follows the first picture, in decoding order, has a POC value that is equal to the POC value of the recovery point picture as indicated in the recovery point SEI message, that the second picture having the POC value equal to the POC value of the recovery point picture is the recovery point picture; and
   means for determining, based on a determination that no picture that follows the first picture, in decoding order, has the POC value that is equal to the POC value of the recovery point picture as indicated in the recovery point SEI message, that a next picture, in decoding order, that has a POC value greater than the POC value of the recovery point picture, is the recovery point picture.

18. The device of claim 17, further comprising:
   means for determining, in response to the determination that the second picture having the POC value equal to the POC value of the recovery point picture, as indicated in the recovery point SEI message, is the recovery point picture, that the second picture is a last picture, in decoding order, among a gradual decoder refresh (GDR) set of pictures; and
   means for determining, in response to the determination that no picture that follows the first picture, in decoding order, has the POC value that is equal to the POC value of the recovery point picture as indicated in the recovery point SEI message, that a picture that immediately precedes the recovery point picture is the last picture, in output order, of the GDR set.

19. The device of claim 17, wherein the information indicative of the POC value of the recovery point picture comprises information indicative of a difference between a POC value of the first picture and the POC value of the recovery point picture.

20. The device of claim 17, further comprising means for producing, based on an initiation of random access decoding starting at the access unit associated with the recovery point SEI message, decoded pictures, at or subsequent to the recovery point picture, that are indicated to be correct in content or approximately correct in content.

21. The device of claim 17, further comprising means for displaying reconstructed video data.

22. The device of claim 17, further comprising at least one of:
 one or more integrated circuits;
 one or more microprocessors;
 one or more digital signal processors (DSPs);
 one or more field programmable gate arrays (FPGAs);
 a desktop computer;
 a laptop computer;
 a tablet computer;
 a phone;
 a television;
 a camera;
 a display device;
 a digital media player;
 a video game console;
 a video game device;
 a video streaming device; or
 a wireless communication device.

* * * * *